United States Patent
Franco et al.

(10) Patent No.: US 6,687,745 B1
(45) Date of Patent: Feb. 3, 2004

(54) SYSTEM AND METHOD FOR DELIVERING A GRAPHICAL USER INTERFACE OF REMOTE APPLICATIONS OVER A THIN BANDWIDTH CONNECTION

(75) Inventors: Louis M. Franco, Hoboken, NJ (US); Frank Leon Rose, Brooklyn, NY (US); Philip S. J. Brittan, Brooklyn, NY (US); Mark Cunningham, Brooklyn, NY (US); Alex Bulkin, Brooklyn, NY (US); Mat Baskin, Bronx, NY (US); Greg Blonder, Summit, NJ (US)

(73) Assignee: Droplet, Inc, New York, NY (US)

( * ) Notice: Subject to any disclaimer, the term of this patent is extended or adjusted under 35 U.S.C. 154(b) by 516 days.

(21) Appl. No.: 09/599,382

(22) Filed: Jun. 22, 2000

Related U.S. Application Data

(60) Provisional application No. 60/153,917, filed on Sep. 14, 1999.

(51) Int. Cl.[7] .............................................. G06F 15/16
(52) U.S. Cl. ................................................... 709/219
(58) Field of Search .............................. 709/203, 202, 709/213, 217

(56) References Cited

U.S. PATENT DOCUMENTS

| | | | | |
|---|---|---|---|---|
| 5,805,815 A | * | 9/1998 | Hill | 709/218 |
| 5,838,916 A | | 11/1998 | Domenikos et al. | 395/200.49 |
| 5,877,765 A | * | 3/1999 | Dickman et al. | 345/738 |
| 5,890,161 A | | 3/1999 | Helland et al. | 707/103 |
| 5,903,901 A | | 5/1999 | Kawakura et al. | 707/501 |
| 5,915,112 A | | 6/1999 | Boutcher | 395/684 |
| 5,940,074 A | | 8/1999 | Britt, Jr. et al. | 345/333 |
| 6,009,410 A | * | 12/1999 | LeMole et al. | 705/14 |
| 6,035,324 A | | 3/2000 | Chang et al. | 709/203 |
| 6,065,043 A | | 5/2000 | Domenikos et al. | 709/203 |
| 6,115,741 A | | 9/2000 | Domenikos et al. | 709/217 |

* cited by examiner

*Primary Examiner*—David Y. Eng
(74) *Attorney, Agent, or Firm*—Brown Raysman Millstein Felder Steiner

(57) ABSTRACT

A method and system are disclosed for delivering interactive links for presenting applications and second information at a client computer from remote sources in a network-configured computer processing system. In one embodiment, the method includes retrieving over a first communication connection, in response to a request of a client computer, informational content having computer program code embedded therein, and executing the embedded computer program code for establishing a second communication connection to an application server. The method further includes retrieving over the second communication connection first information including presentational information for presenting the application and the second information. The method also includes presenting the application and the second information based upon the presentational information, and storing on the client computer an interactive link for selectively re-establishing the second communication connection to the application server for retrieving the first information and presenting the application and the second information on an as-needed basis. Preferably, the storing of the interactive link includes downloading a graphical representation of the interactive link and storing a file containing information representing an operating environment of the client computer and a network address of the application server.

26 Claims, 8 Drawing Sheets

SYSTEM AND METHOD FOR DELIVERING A GRAPHICAL USER INTERFACE OF REMOTE APPLICATIONS OVER A THIN BANDWIDTH CONNECTION

CROSS REFERENCE TO RELATED DOCUMENTS

Priority is herewith claimed under 35 U.S.C. §119(e) from copending Provisional Patent Application No. 60/153,917, filed Sep. 14, 1999, entitled "METHOD AND SYSTEM FOR DELIVERING APPLICATIONS IN CLIENT/SERVER ENVIRONMENT," by Louis M. Franco et al. The disclosure of this Provisional Patent Application is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to computer processing systems and, more particularly, to an object-oriented approach for delivering interactive links to applications and information stored in remote sources of a network.

BACKGROUND OF THE INVENTION

An important aspect of any computing system is the interface between a human user and a computer. An early type of interface was text based. In a text based interface a user communicates with the computer by typing text characters with a keyboard and the computer communicates with the user by displaying text characters on a display screen or monitor. Recently, graphical user interfaces (GUIs) have become increasingly popular. In a GUI, a computer communicates with a user by displaying graphics, including text and images, on a monitor and the user communicates with the computer by typing in textual commands and/or by manipulating the displayed images with a pointing device such as, for example, a mouse, track ball, pressure-sensitive pad, electronic stylus or pen, or like devices.

Many GUIs are implemented in a operating environment referred to as a window environment. In the window environment, the display on the monitor of the computer is represented as an electronic "desktop," each application program available on the computer may be represented as an "icon" on the desktop, and each application program running on the computer may be represented as one or more electronic "sheets" displayed in regions of the monitor referred to as "windows."

Generally speaking, an application program presents information to the user through a window by drawing or "rendering" images, graphics or text within the window region. The user communicates with the application program by selecting objects in the window region with a cursor, which is controlled by a pointing device, and/or also by typing information into the keyboard. In the window environment, the objects and the window regions may be manipulated or moved about the desktop, and changed in size and appearance so that the user can arrange and/or customize the appearance of the desktop in a convenient manner. The manipulation of an object by using a pointing device to capture and move the object somewhere else on the desktop, from one window region to another window region or within a window region, is generally referred to as a "drag and drop" operation.

The window environment described above is generally part of the computer's operating system. The operating system also typically includes utility programs that enable the computer system to perform basic tasks, such as rendering objects on the display monitor, storing and retrieving information on a memory device, performing file operations and communicating with a network. The application programs interact with the operating system to provide a direct interface with the user and higher level functionality such as, for example, to perform word processing or other specific tasks. Accordingly, the computer includes mechanisms for coordinating the operation of the operating system and application programs, including the arrangement of objects on the display monitor.

Computer processing systems are often implemented in network configurations such as "client/server" configurations. In client/server configurations, a number of personal computers, work stations, portable and/or handheld devices or the like ("clients") are linked and communicate with one or more host computers ("servers"). The servers process requests from the clients for information and/or application programs shared by the clients over the network. Today, many local and wide area public and private networks are interconnected to form a world-wide network of networks generally referred to as the Internet. The Internet permits access to a wealth of information and services stored at individual nodes or sites on the network. A particularly important subset of the Internet is the World Wide Web or "web." The web introduces graphics capabilities to Internet communications.

Sites on the web, generally referred to as web sites, are connected or linked together using a special communication protocol such as, for example, Hypertext Transport Protocol (HTTP), and a Uniform Resource Locator (URL) that includes a specific syntax for defining a network connection on the web. HTTP permits an exchange of information between users and the web sites that contains subject matter of interest to the users. From a user's prospective, the web appears as a collection of viewable documents, or web pages, residing at the various web sites. A user accesses the web pages by executing software, generally referred to as a web browser. A web browser running on the user's computer sends instructions (including the desired URL) for connecting to a specified host computer (i.e., web server) that stores web pages of interest to the user. A link, such as a hyperlink, is created under the communication protocol. By selecting links and employing a web browser, a user may "navigate" from one document to another, and from one web site to another, to access informational content and services available across the web.

One of the fastest growing uses of the Internet is as a vehicle of commerce. The world-wide access achieved by use of the web makes the web ideal for both small and large businesses who may enter the market by "launching" web sites offering their goods and/or services for sale. As a result, the informational content and services available to users of the web are considerable and are growing more so, everyday.

Despite the success of the web, problems persist for both users and businesses. For example, users need to locate items or services of interest from the vast number of sites on the web and, similarly, businesses need to distinguish themselves from competition to attract and hold the interests of desirable customers.

Search engines assist users in locating content and services of interest. However, even armed with searching tools, locating and retrieving informational content and services of interest from the many hundreds of thousands of web sites currently operating over the web may be cumbersome. The results of searches typically yield so many web sites that the effort to review the results and narrow the search may be overly cumbersome.

To distinguish their goods and/or services on the web, businesses often advertise their web site names in conventional media such as television and/or print advertisements. Businesses may also employ a web based solution in which rich, visually pleasing advertisements are incorporated in a number of popular web sites. The advertisements, generally referred to as "banner ads," often include links to the business' web site. Therefore, when the banner ad is selected, the user is transferred to the business web site where further information regarding the goods/services are displayed.

A perceived disadvantage of existing systems and methods for locating sites of interest and/or for attracting customers is that the links to the sites of interest generally must be acted upon from the page they are displayed or they are lost. In other words, conventional systems and methods present web sites that may include static links to other web sites. If a user is interested in viewing the other web site then the user must navigate to it or record the URL of the site for later use. As can be appreciated, it may be undesirable for the user to leave the current site to follow the link to the other site as the user may be performing an important and/or time sensitive task. As a result, a potentially valuable marketing or sales opportunity may be lost.

Facilities presently exist for storing an address (URL) of a web site currently being displayed. One such facility is referred to as a "bookmark." Once created, bookmarks offer a means of retrieving the URL of a particular web site and directing the user's browser to display the page residing at the UkL. Bookmarks eliminate the need for the user to manually enter the URL of a site of interest or to retrace (re-navigate) a path through the Internet to arrive at the web site through a known link. However, bookmarks are limited in two respects. Firstly, a web page must be displayed before the URL corresponding to the web page can be stored as a bookmark. Secondly, bookmarks do not maintain information pertaining to a previous operating state of the web site. For example, a bookmark may return a user to a previously displayed web page, such as a form for completing a commercial transaction, but information that may have been completed on the form is generally not saved. That is, the completed information is generally not stored unless the information is made available through another tracking facility referred to as a "cookie." Cookies maintain tracking information on the user's computer that may be referenced once the browser reloads the desired web page and invokes the application included therein. Once the application is invoked, information that was previously entered and stored in the cookie may be restored in the application. Cookies, however, are generally time-sensitive and may expire before a user attempts to re-navigate to the site of interest. Also, cookies are only stored on the computer where the original transaction occurred. If the user accesses the site from another computer, the tracking information is not available.

Therefore, there is a need for storing an interactive link on a user's computer which, when selected, retrieves and presents applications and/or information stored at remote locations across the network. There is also a need for the interactive link to include facilities for restoring previous operating states of the application as the application is re-presented at a user's computer.

OBJECTS OF THE INVENTION

Accordingly, it is an object and advantage of this invention to provide interactive links to applications and information remotely stored across a network.

It is another object and advantage of this invention to provide graphical representations of interactive links to remotely stored applications and information, the graphical representations being downloadable to client computers and selectively employed to retrieve and present the remotely stored applications and information on the client computers.

It is still another object and advantage of this invention to provide graphical representations of interactive links to remotely stored applications and information, the graphical representations being downloadable to and transferable between one or more client computers for selectively retrieving and presenting remotely stored applications and information on each of the client computers.

It is yet another object and advantage of this invention to provide interactive links to remotely stored applications and information, wherein when selectively employed to retrieve and present the remotely stored applications and information on a client computer, a previous operating state of the applications and information may be restored.

It is still another object and advantage of this invention to provide graphical representations of interactive links to remotely stored applications and information, the graphical representations being downloadable to client computers and having a commercially recognizable appearance for identifying the remotely stored applications and information.

Further objects and advantages of this invention will become more apparent from a consideration of the drawings and ensuing description.

SUMMARY OF THE INVENTION

The foregoing objects and advantages are realized by methods and apparatus in accordance with embodiments of this invention, wherein interactive links for retrieving applications and information from remote sources in a network configured computer processing system are presented.

In one embodiment, a method for delivering the interactive links includes storing at a first remote source (e.g., a content provider) informational content (e.g., applications and information) having computer program code embedded therein. The method includes retrieving the informational content by a client computer of the system over a first communication connection to the content provider. In response to the retrieval of the informational content, the method further includes executing at the client computer the computer program code embedded in the informational content for establishing a second communication connection to a second remote source (e.g., an application server) on the network, and presenting via the second communication connection to the application server remotely stored applications and information. The remotely stored applications are executable at the application server for providing functionality of interest to the client computers. The information presented over the second communication connection includes at least presentational information providing at least one of instructions for rendering components of the remotely stored application, default parameters and data values exhibited within the components, and application-specific business logic for processing input to the application.

The method also includes storing on the client computer an interactive link for selectively re-establishing the second communication connection to the application server for invoking and presenting the remotely stored application and information on an as needed basis.

Additionally, the method includes downloading to the client computer a graphical representation of the interactive link from within the informational content delivered over the first communication connection, associating to the graphical representation a file containing information representing an operating environment of the client computer and a network address of the application server, and displaying the graphical representation on the client computer. Preferably, the downloading of the graphical representation is achieved in an improved drag and drop operation.

In accordance with a preferred embodiment, the graphical representations of the interactive links includes information for identifying the respective remotely stored application and information invoked by the interactive link, and a symbol indicating that the graphical representation is an interactive link. In one embodiment, the identifying information includes at least one, or both, of an icon and a label representing a commercially recognizable brand name of the remotely stored application and information, and the symbol is a teardrop-shaped symbol.

Once the interactive link and the graphical representation are downloaded, the graphical representation may then be selected. In response to the selection, the method includes accessing the contents of the file associated to the graphical representation and re-establishing the second communication connection to the application server for invoking and presenting the remotely stored application and/or information associated to the interactive link.

In yet another embodiment, the method includes storing at the application server information representing a first operating state of the remotely stored application and/or information for a particular user, and in response to the selection of the graphical representation, presenting the first operating state information as the remotely stored application and/or information is presented to that particular user.

In a still further embodiment, the method includes transmitting a copy of the interactive link to a next client computer such that the next client computer is operable for selectively establishing the second communication connection to the application server for invoking and presenting, at the next client computer, the remotely stored application and information. In this embodiment, information may be stored for tracking transmissions of interactive links between the client computers of the network-configured computer processing system.

In a preferred embodiment, the network-configured computer processing system includes an Internet connection and the client computer includes a desktop-based repository for links to the remotely stored applications and information and an Internet-based repository for the links. Accordingly, the interactive links may be selectively stored in the desktop-based repository or in the internet-based repository. Alternatively, the links are stored in both of the desktop-based repository and the internet-based repository.

In accordance with the present invention, a computer processing system is configured and operates as follows. The system includes a plurality of client computers that each includes an application program code, an operating system program code and a presentational client program code operating thereon. The application program code requests informational content, applications and information stored remotely across a network. The system also includes a first server computer (e.g., the content provider) that stores informational content. Predetermined ones of the informational content include computer program code embedded therein. The content provider delivers the informational content in response to requests from the client computers. A second server computer (e.g., the application server) is included within the system. The application server stores applications that may be invoked for presenting functionality of interest at the client computers. The application server also stores information such as presentational information including at least one of instructions for rendering components of the application, default parameters and data values exhibited within the components, and application-specific business logic for processing input to the application.

The system also includes a communication connection between a requesting client computer and the application server. The communication connection is formed in response to an initial delivery of one of the predetermined informational content and an execution of the computer program code embedded therein. The presentational client program code, utilizing the communication connection, presents functionality of the remotely stored applications and information on the requesting client computer. The communication connection is disconnected upon termination of the remotely stored applications and information. The system further includes an interactive link that is stored at the requesting client computer for selectively reforming the communication connection to the application server, re-invoking the remotely stored applications and information, and re-presenting the functionality of the remotely stored applications at the requesting client computer.

Preferably, the predetermined ones of the informational content include the interactive link. When stored on the client computer, the interactive link includes a graphical representation of the remotely stored applications and information presented on the client computer and a file containing information representing an operating environment of the client computer and a network address of the application server computer. In this preferred embodiment, the graphical representation includes a symbol for indicating that the graphical representation is of an interactive link and at least one of an icon and a label representing a commercially recognizable brand name of the remotely stored applications and information.

In another embodiment, the application server includes a data repository for storing information representing a first operating state of the remotely stored applications and information presented to a particular user at a client computer. Accordingly, the system further includes a device for retrieving, delivering and presenting the previous operating state information from the data repository as the remotely stored applications and information are presented to the particular user at the same or another client computer.

In yet another embodiment, the system includes a device for transmitting and storing a copy of the interactive links at a next client computer. When the links are stored, the next client computer is operable for selectively requesting the remotely stored applications and information and forming the communication connection between the next client computer and the application server. The system further includes a data repository for storing information for tracking transmissions of interactive links between the client computers.

BRIEF DESCRIPTION OF THE DRAWINGS

The above set forth and other features of the invention are made more apparent in the ensuing Detailed Description of the Preferred Embodiments when read in conjunction with the attached Drawings, wherein:

FIGS. 4A–4D illustrate an improved drag and drop operation in accordance with one embodiment of the present invention;

Identically labeled elements appearing in different ones of the above-described figures are intended to refer to the same elements but may not be referenced in the description for all figures.

DETAILED DESCRIPTION OF THE PREFERRED EMBODIMENTS

Figure 1:
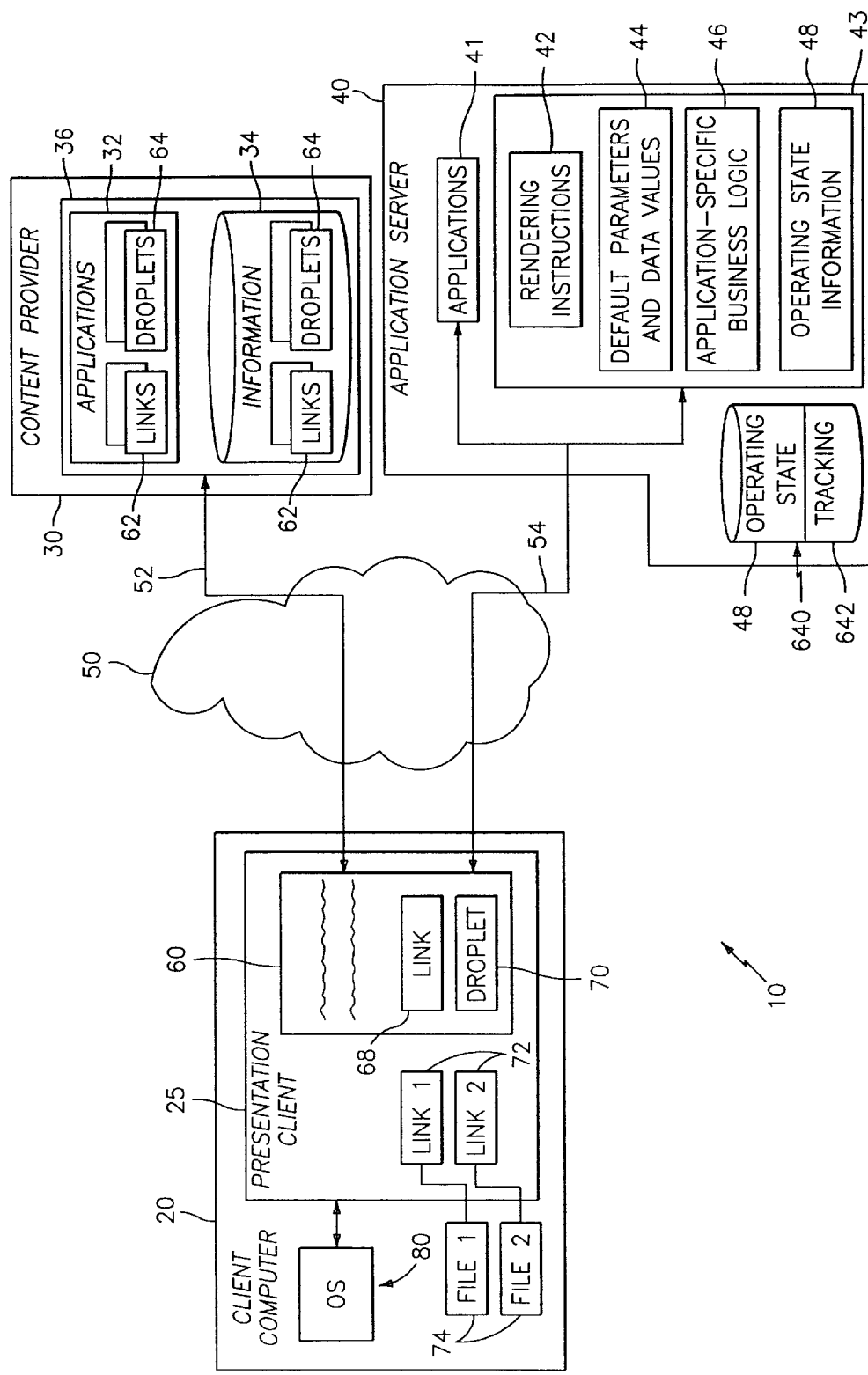
FIG. 1 is a block diagram of an exemplary droplet-enabled client/server system constructed and operating in accordance with one embodiment of the present invention.

FIG. 1 illustrates the general architecture of a client/server configured computer processing system 10 constructed and operating in accordance with the present invention. For illustration purposes, FIG. 1 shows a single client computer 20 operatively coupled over a network 50 to a content provider 30 and an application server 40. However, the present invention contemplates (as discussed below with reference to FIG. 8) that the system 10 includes a plurality of client computers operatively coupled over the network 50 to two or more host/server computers. While the content provider 30 and the application server 40 are referred to herein as two separate computers, it is within the scope of the present invention for these computers 30 and 40 to be the same physical computer serving two logically separate functions. In a preferred embodiment, the network 50 is a packet-switched network such as, for example, the Internet, an intranet or an extranet. It should be appreciated that it is within the scope of the present invention for the network 50 to include wired and wireless connections between the client computers and server computers.

The content provider 30 services requests from the client computer 20 for informational content 36 such as, for example, applications 32 or information 34 shared by users over the network 50. In accordance with the present invention, the informational content 36 delivered to the client computer 20 by the content provider 30, over a communication connection 52, may include one or more links 62 and droplets™ 64. For example, a document 60 delivered to the client computer 20 includes a link 68 and a droplet 70. In some embodiments, a droplet™ is an application, or set of applications, that executes on the client computer 20 and, in cooperation with a presentation client 25 (installed at the client computer 20) and an operating system of the client computer 20, shown generally at 80, establishes a communication connection 54 with the application server 40 for retrieving information 43 and presenting functionality of remotely stored applications 41 on the client computer 20. The informational content 36 containing droplets™ may hereinafter be referred to as "droplet-enabled" content.

In one embodiment, the requested applications 32 and/or information 34 include functionality presented on the client computer 20 by the applications 41 executing remotely on the application server 40. That is, the application 41 is invoked by the droplet 70, as the droplet 70 executes on the client computer 20. As discussed in detail below, the links within the delivered informational content 36 (e.g., link 68) may be stored locally on the client computer 20 as interactive links 72 that, when selected, retrieve the information 43 and invoke the applications 41 to present the functionality of the applications 41 at the client computer. In particular, when performing a subsequent retrieval of the functionality presented by the applications 41, the applications 32 and/or information 34 that originally provided the link 68 (now locally stored as the interactive link 72) to the applications 41 need not be retrieved. Rather, the interactive link 72 can be employed to directly invoke and execute the applications 41 on the application server 40 to provide the requested functionality at the client computer 20. The initial and subsequent retrieval of droplet-enabled content and applications is discussed in further detail below.

Initially, droplets™ 64 execute as the informational content 36 containing the links 62 and droplets™ 64, e.g., the document 60 containing the link 68 and the droplet 70, is delivered to the client computer 20. That is, the droplet 70 executes and notifies the droplet presentation client 25 that it has been loaded to the client computer 20. Next, the droplet 70 cooperates with the droplet presentation client 25 and the operating system software 80 of the client computer 20 to establish the communication connection 54 to the application server 40. The link 68 is an interactive link presented within the informational content 36 for invoking the applications 41 and retrieving information 43 residing at remote locations on the network 50. Once the communication connection 54 is established, the droplet 70 transmits a startup message to the application server 40. In response to the receipt of a startup message from the droplet 70, the application server 40 executes the associated application 41 to present the application functionality and information 43 to the client computer 20.

In accordance with the present invention, droplets™ (e.g., the droplets 64 and 70) are dynamic and "thin" applications. That is, the droplets™ generally include information identifying the operating environment on the client computer 20, the application server 40 to connect with and an application on the server 40 that is run to deliver the requested functionality to the client computer 20 once the connection is made. The information identifying the operating environment on the client computers 20 provides information to the application server 40 regarding the operating system and hardware capabilities of the particular client computer 20 that requested the droplet-enabled content 36. That is, the plurality of client computers 20 may include computer workstations, personal computers and portable devices such as, for example, laptop and notebook computers, PalmPilots and internet-enabled radio telephones. As is apparent to those in the art, each such device platform includes differing user interfaces. As such, not all client computers 20 are capable of presenting for example, full color, high-resolution graphics. By providing the operating environment of the requesting client computer 20 to the application server 40, the application server 40 provides information 43 to present the requested applications 41 on the client computer 20. The information 43 includes, for example, instructions 42 for rendering graphical objects within the presented applications 41, default parameters or data values 44 displayed within the applications 41 and application-specific business logic 46 for processing inputs to the applications 41.

In accordance with one aspect of the present invention, a droplet application developer creates droplet-enabled applications or served versions of each application for presenting particular functionality to client computers having differing user interface ("UI") requirements. For example, a droplet-enabled email application may be implemented a number of ways such that a first version may operate on a personal computer having capabilities for providing full color, high-resolution graphics and a second version for operating on an internet-enabled radio telephone having only text-processing capabilities. In accordance with this aspect of the present invention, a droplet communicates one of the differing client environments and, in particular, client UI requirements, to the application server 40 which automatically provides, for example, the first version to a requesting personal computer and the second version to the requesting radio telephone. Alternatively, the droplet™ could determine UI requirements from the client operating system or other locally stored data.

Since droplets™ store a limited amount of information, that is, only the information necessary for establishing a connection (e.g., the communication connection 54) to a application server 40, droplets™ require a minimum amount of storage space on a client computer, for example, no more than about 500k bytes. Similarly, during execution, droplets consume no more than about 2M bytes of heap (dynamic memory allocation space). Therefore, a large number of droplets™ may execute simultaneously without significantly reducing the memory available for other, concurrently executing applications. The droplet presentation client 25 requires local storage of about 1M bytes for a complete installation. Once the droplet presentation client 25 is installed locally, the client computer 20 is "droplet-enabled."

It should be appreciated that, in one embodiment, the droplets (i.e., droplet 70) may include rendering instructions, parameters and/or data values that override the default information (i.e., the instructions 42 and values 44) received from the application server 40.

Preferably, the communication connection 54 initiated by the droplet 70 between the client computer 20 and the application server 40 is transparent to the user. That is, when the requested informational content 36 is delivered and presented on a display device of the client computer 20, the droplet 70 executes and, with the presentation client 25, establishes the communication connection 54. As noted above, the informational content 36 may include links to remotely stored applications 41, that are invoked to present functionality at the client computer 20. Presentational information 43 to present and serve, for example, various graphical objects (GUI objects) such as windows, edit boxes, drop-down lists, check boxes, buttons and/or labels included within the application 41, is received over the communication connection 54 as the functionality is presented on the display device or monitor of the client computer 20.

Figure 2:
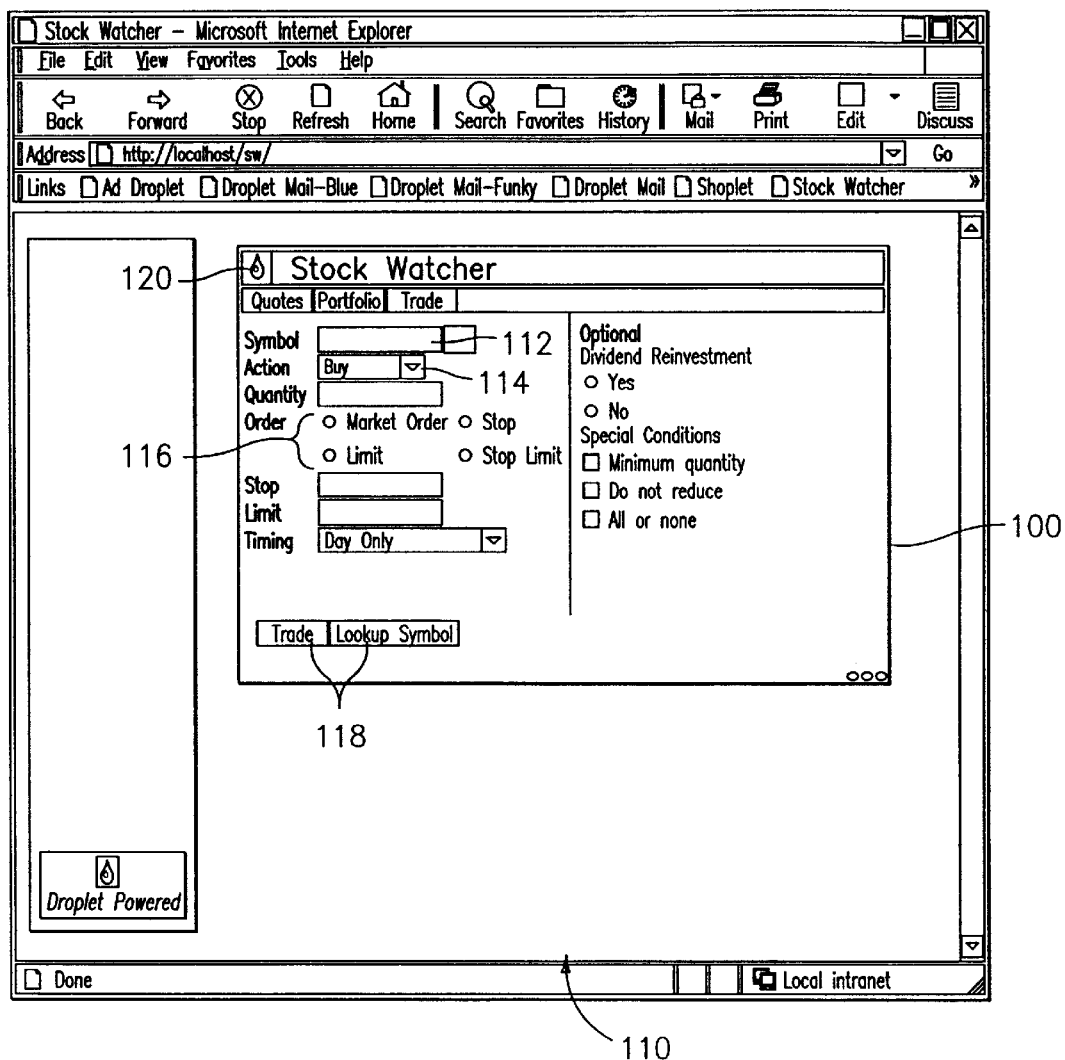
FIG. 2 illustrates a web page including an exemplary droplet-enabled application in accordance with one embodiment of the present invention.

FIG. 2 illustrates a droplet-enabled application 100 entitled "Stock Watcher" that is presented on the desktop of the client computer 20. In this exemplary embodiment, the Stock Watcher application 100 is presented within a window on a web page, shown generally at 110, utilizing the MICROSOFT® Internet Explorer™ web browser application. As should be appreciated, the present invention contemplates other presentational mechanism for droplet-enabled applications, that is, non-web based delivery such as a stand alone application program provided via a CD disk, floppy disk or like storage media. Other exemplary mechanisms are discussed in detail below.

As is known, web pages such as web page 110 are constructed using software such as the Hypertext Markup Language (HTML). A web page (i.e., web page 110) is droplet-enabled by embedding one or more droplets™ within the page. Preferably, the droplets are embedded by using software commands such as, for example, "<applet>" or "<embed>" tags of the HTML language. As a web browser encounters a droplet-enabled web page, such as web page 110, instances of the droplets are invoked to initiate the communication connection 54 with the application server 40, as discussed above. Therefore, as a user navigates to web page 110, the droplets associated with the Stock Watcher application 100 are encountered in the web page 110 and execute. A droplet, in cooperation with the droplet presentation client 25, delivers the Stock Watcher application 100 over the communication connection 54, and presents the application 100 within web page 110. It should be appreciated that the user is generally unaware of the communication connection 54 established to the application server 40, as web page 110 and its corresponding GUI objects, e.g., text box 112, drop-down list 114, radio buttons 116 and command buttons 118, are presented within the web page 110 as the page 110 is loaded.

The Stock Watcher application 100 also includes an object referred to as a droplet handle 120. FIG. 2 presents the droplet handle 120 in a preferred configuration representing a teardrop-shaped icon on the application's title bar. As is discussed in detail below, droplet handles may be icons, graphical images, or strings of text, that may be selected and downloaded to store, on a client computer 20, the interactive links (e.g., links 72 of FIG. 1) to droplet-enabled applications 41 remotely stored across the network 50.

In accordance with the present invention, droplets™ are generic or universal applications that can be implemented on a variety of computer hardware and software platforms. For example, and as discussed briefly above, the droplet-enabled client/server system 10 may be implemented in an Internet environment. In this respect, droplets™ may include a downloadable Java applet, ActiveX controls, a browser plug-in written in the Java, C++ or other suitable programming language, or other multimedia objects, that are invoked as a web page is loaded. In the web based implementation, the droplets™ cooperate with the droplet presentation client 25 and the web browser running on the client computer 20 to establish the communication connection 54 to the application server 40 and to present the droplet-enabled applications 41 and information 43 on the web page.

Alternatively, the droplets™ may be included within a stand-alone software application that is installed and executes on the client computer 20. As connection to the application server 40 is still desirable in the stand-alone implementation, the droplets™ include capabilities for establishing the communication connection 54 to the application server 40 and for presenting the droplet-enabled applications 41 and information 43 for use within the stand-alone application. Therefore, the droplets™, the droplet presentation client 25, the local operating system 80 of the client computer 20 and the web browser or stand-alone software program executing on the client computer 20 cooperate to establish the communication connection 54 to the application server 40 through conventional means such as, for example, with socket connections or by transmitting and receiving HTTP transactions.

As is apparent to those of skill in the art, the cooperation between the droplets™ the droplet presentation client 25, the local operating system 80 of the client computer 20 and the web browser or stand-alone software program executing on the client computer 20 to establish the connection to the application server includes the communication and sharing of information and a variety of functions and programming interfaces (generally referred to as APIs). That is, in the preferred embodiment of the present invention, standard operating system interfaces are utilized to access, create, control and manipulate features and functions of the client computer 20 such as, for example, window management, GUI and multimedia object management, system service procedures to establish socket and network connections, and generally any integration between the remotely executing applications, droplets, locally executing application and underlying operating system.

Whether in a web based or stand-alone implementation, the information 43, that is, instructions 42 for rendering graphical objects within the delivered droplet-enabled applications 41, default parameters or data values 44 displayed within the droplet-enabled applications 41 and application-specific business logic 46 for processing inputs to the droplet-enabled applications 41, is provided by the application server 40, in accordance with the operating environment of the requesting client (e.g., the client computer's operating system, user interface and hardware capabilities).

In one embodiment, the information 43 is provided by the application server 40 to the client computer 20 and stored therein in anticipation of a later use in which the user can not, or prefers not, to establish the communication connection 54, e.g., the internet connection, to the application server 40. In this embodiment, for example, the remotely stored application 41 and information 43 are downloaded and locally installed and/or stored at the client computer 20. The locally installed application 41 may be invoked to execute on the client computer 20 by selecting the link, as discussed above. In one aspect of the present invention, the application server 40 may evaluate the capabilities of the client computer 20 and automatically download all or a portion of the application 41 and/or information 43 for local installation on the client computer 20. In this respect, the locally installed application (in the form of, for example, native executables) may execute eliminating, during at least a portion of its execution, the need to receive rendering instructions 42, default parameters 44, or application-specific logic 46 from the application server 40.

In accordance with one aspect of the present invention, a network communication protocol is defined for transmitting information between the droplet-enabled applications 41 and the application server 40. The protocol includes a number of message formats wherein properties of and events pertaining to components, such as the GUI components, of actively operating droplet-enabled applications 41 are communicated between the client computer 20 and the application server 40. The message formats include, for example:

1. Event Notifications—messages transmitted from a client computer 20 to the application server 40 reporting that a value or attribute of a component of the GUI has been altered. Events include, for example, data entry into text boxes and drop-down lists of the GUI, selection ("clicking") of GUI components such as radio and command buttons. Messages are also transmitted in response to other pointing device or keyboard driven actions such as, for example, drag and drop events as an e-mail message is moved to a folder within a droplet-enabled e-mail application.

2. Update Commands—messages transmitted from application drivers, e.g., the application specific logic 46 supporting a droplet-enabled application, on the application server 40 to the client computer 20 requesting action within screen components of the system 10, such as GUI components within the delivered content.

3. Window Commands—messages transmitted from the application drivers on the application server 40 to the client computer 20 that specify that a generic window should be opened or closed, or that the droplet-enabled application should present one of a set of standard dialogs (e.g., a message box, a question box or a menu). The droplet-enabled application may transmit a window command to notify the application server 40 that a user has manually closed an active window on the desktop.

4. Browser Commands—messages directed to a web browser running on the client computer 20 in which the droplet-enabled application is included. If the droplet-enabled application is included within a stand-alone software application that does not include a web browser, then these messages are sent to a default browser.

5. Session Commands—messages transmitted from either the client computer 20 or the application server 40 for initiating, suspending, or terminating sessions between the client computer 20 and the application server 40.

6. Service Directory—messages sent by the application server 40 to inform the client computer 20 of services that are available at the application server 40. Enabled client computers 20 that receive service directory messages can present the directory of services to users and can transmit a user's request for a particular service back to the server for processing.

The above described communication protocol and message formats provide a real-time push/pull messaging scheme between the user interface, and GUI components included therein, of an active droplet-enabled application presented on client computer and application drivers supporting the user interface from the application server 40. For example, an executing droplet-enabled application such as the Stock Watcher application 100 receives real-time information such as revised stock prices or shares available for trading as they are posted by an issuing agency. The user need not manually request a refresh of GUI components presenting the pricing and availability information, rather the client computer automatically receives the real-time updates to the components as the droplet-enabled application runs on the application server 40.

In one embodiment, a continuous open socket communication connection is maintained between the client 20 and server 40 to receive the real-time updates as they are posted (push transaction). In another embodiment wherein, for example, a firewall or proxy server security platform does not permit the continuous open socket connections, a request for updates is periodically transmitted by the client computer 20 to the application server 40. The automatic pseudo-real-time messaging strategy embodies a pull type messaging mechanism. It should be appreciated that the system 10 seamlessly implements this update messaging mechanism by first attempting the real-time push of update information, and if the application server 40 is not permitted to maintain an open connection communication channel, the server 40 informs the client computer 20 to employ the pull-type messaging mechanism by periodically requesting update information. In each of the above-described messaging schemes, the user at the client computer 20 receives the update information without manually requesting a refresh of the information.

Figure 3:
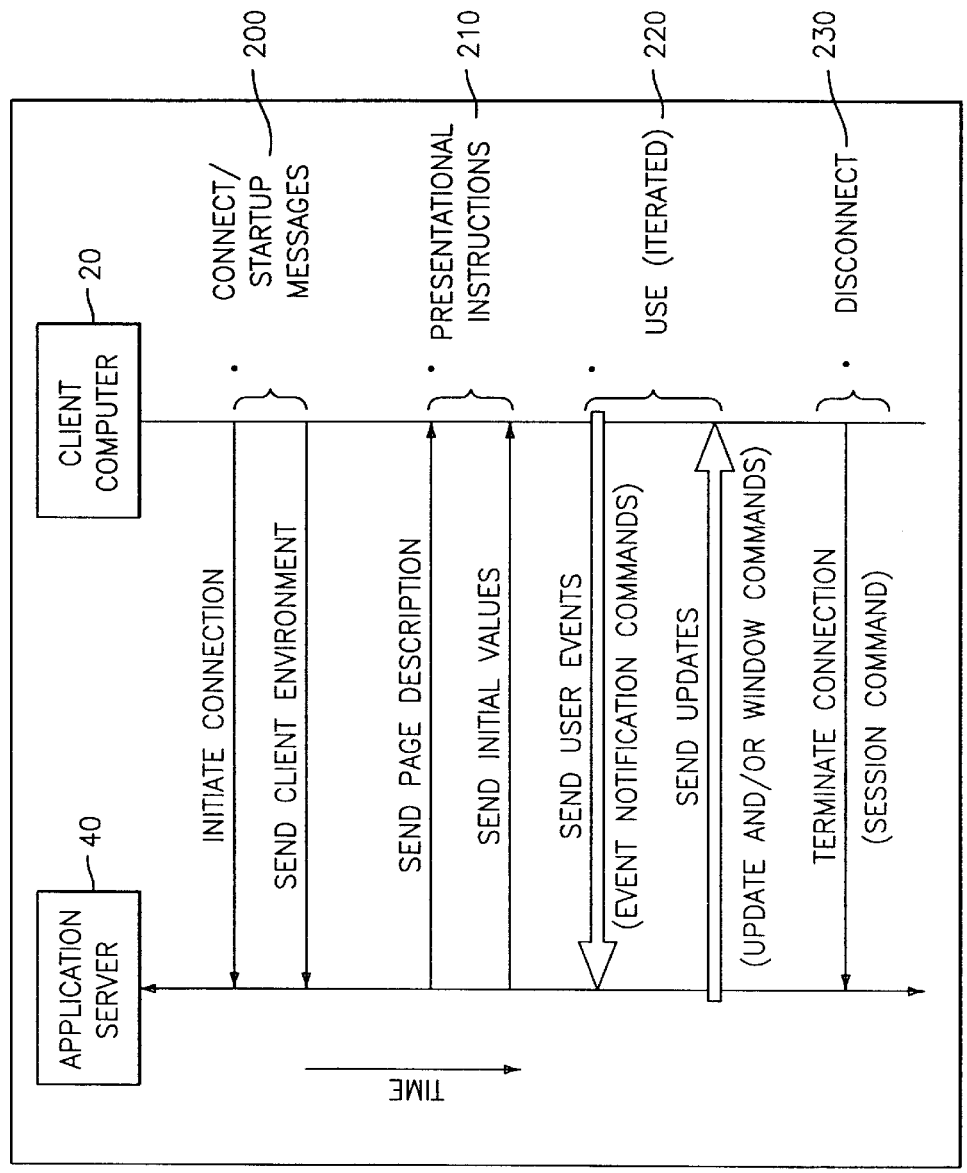
FIG. 3 is a simplified flow diagram illustrating an exemplary flow of messages between an exemplary droplet-enabled client computer and an application server operating in accordance with one embodiment of the present invention.

FIG. 3 is a diagram illustrating a typical sequence of messages transmitted between the client computer 20 and the application server 40. As is shown, connect/startup messages 200 are transmitted to the application server 40 by the droplet 70 running on the client computer 20 when the droplet-enabled content 36 is delivered to the client computer 20. The startup messages 200 include information identifying the operating environment on the client computer 20, the application server 40 to connect with and an application on the server 40 that is run to deliver content to the client computer 20 once the connection is made.

As discussed above, the information identifying a client computer's operating environment provides the application server 40 a means for presenting a droplet-enabled application having a user interface customized to the capabilities of the client computer's operating systems and hardware.

The application server 40 responds to the startup messages 200 by transmitting messages 210 including information 43 (e.g., rendering instructions 42, default parameters and values 44, etc.) to present the droplet-enabled applications 41 on the client computer 20. In the web-based implementation, the droplet-enabled application 41 is preferably executing on the application server 40 as the messages 210 are provided to the client computer 20. During the course of executing the droplet-enabled applications 41 and presenting the functionality thereof on the client computer 20, messages 220 including event and update information are repeatedly communicated between the client computer 20 and the application server 40. As such, the droplets facilitate an interactive communication environment between the client computer 20 and the application server 40.

Finally, a message 230 including a terminate session command is transmitted to the application server 40 when, in the web-based implementation, the web page containing the droplet-enabled application is closed or the user navigates to another page, and, in the stand-alone implementation, as the stand-alone droplet-enabled application is closed or otherwise terminated.

The communication protocol and message formats (discussed in detail above) provide real-time communication between the client computers 20 and the application server 40. It should be appreciated that the communication protocol and messaging format transmit information that define differences between a current application state and a next application state, the information being referred to herein as net change information. Transmitting net change information permits, for example, a change of state of individual components on a screen as opposed to transmitting all screen data and repainting the entire screen from the transmitted screen data. By transmitting only net change information, communication resources such as, for example, bandwidth and transmission times are optimized. As such, droplet-enabled applications deliver rich application functionality over minimum network bandwidth and may operate over thin dial-up or wireless networks as well as broadband networks. Further, droplet-enabled applications supported from remote network sites appear as responsive as applications loaded and executing locally on the client computer 20.

The above described message formats and general sequence of messaging are utilized by the droplet-enabled applications 41 and the application server 40 to support, in cooperation with the presentation client 25 and the local operating system (e.g., operating system software 80), the following features and functions on the desktop of the client computer 20:

1. downloading interactive links to droplet-enabled applications and information;
2. branding of droplets;
3. transferring of links to droplet-enabled application/information between client machines;
4. securing an instance of a droplet-enabled application/information;
5. tracking droplet dispersion information;
6. providing an ubiquitous event channel;
7. persistent state maintenance;
8. mirroring desktop to webtop;
9. multiple platform implementation of droplets; and
10. security features.

Downloading Interactive Links to Droplet-enabled Application and Information:

As discussed in the Background Section of this Specification, objects displayed on a GUI (e.g., on the desktop or a window region thereof) may be captured and moved about the GUI in a "drag and drop" operation. In accordance with the present invention, the links to droplet-enabled applications within informational content 36 delivered to a client computer (e.g., a link to a droplet-enabled application presented within a banner ad on a web page) may be downloaded to the client computer via a drag and drop operation. That is, a droplet handle object incorporated on the banner ad of the delivered informational content 36 may be captured by, for example, selecting the droplet handle object, and moving (dragging) the handle about the client computer's GUI. When in a desired location or position on the client computer, the droplet handle object may be locally loaded (dropped) in an improved drag and drop type of operation.

Specifically, the present invention supports the downloading (e.g., dragging and dropping) of links to droplet-enabled applications within delivered informational content 36 from: (1) a web page onto the desktop; (2) a first window region onto another window region that accepts files; and (3) a web page or window region onto a directory or an application program's menu such as, for example, the Start Menu of the Microsoft Windows™ operating system software. Accordingly, locally stored links are selected to invoke and present, on the client computer 20, functionality provided by droplet-enabled applications, executing on the application server 40, and information on an "as-needed" basis.

Figure 4A:
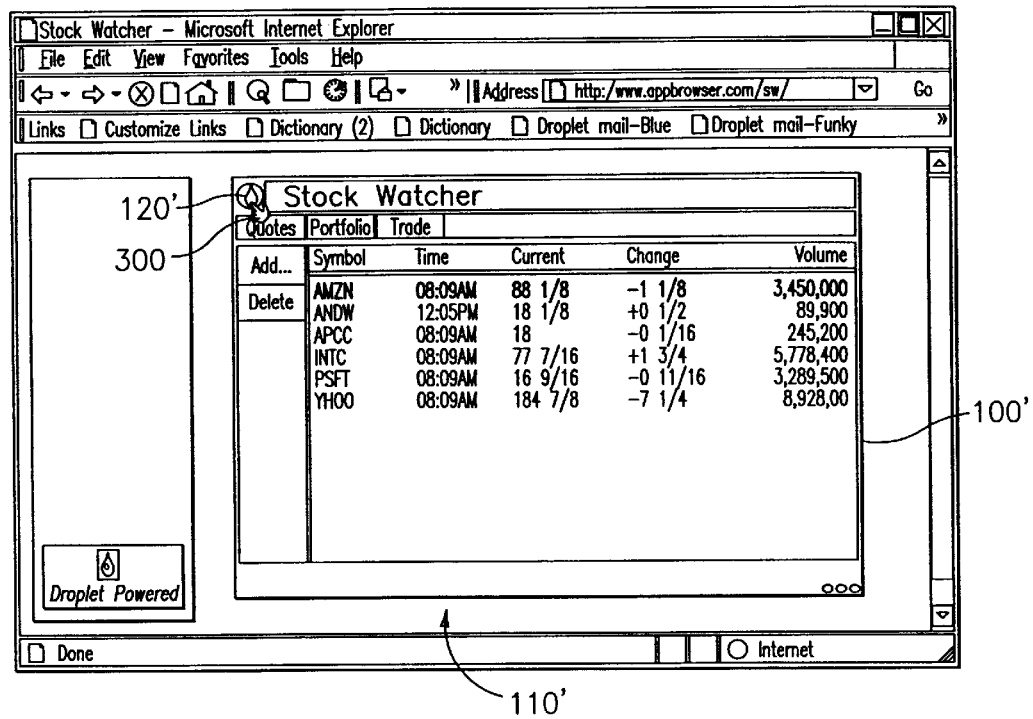
Figure 4B:
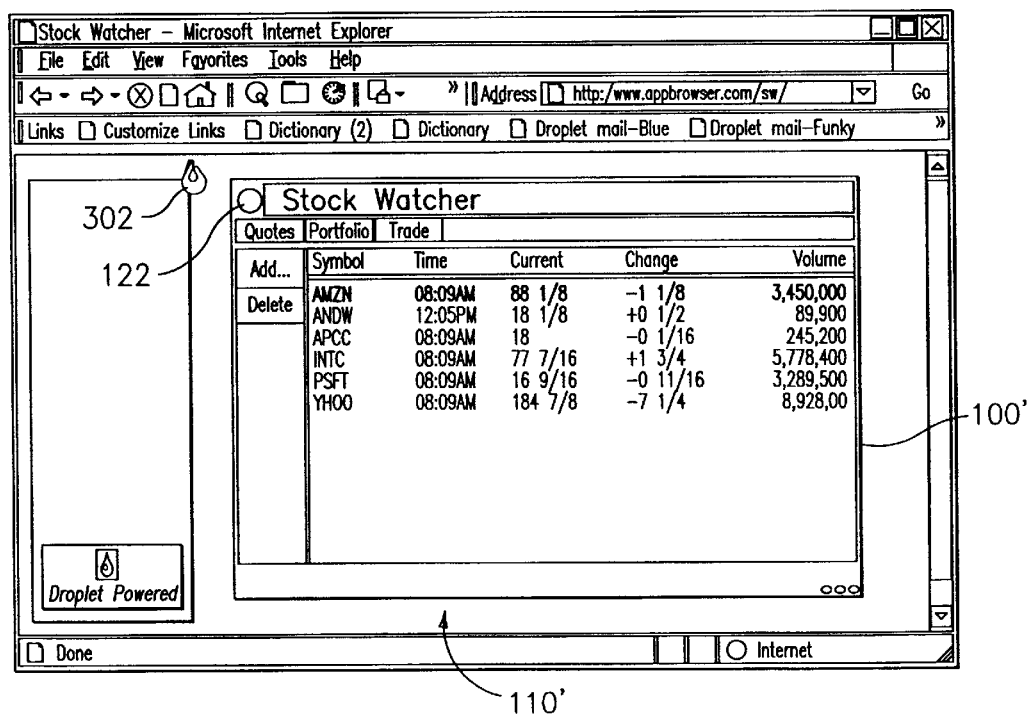

With reference to FIGS. 4A–4D, a preferred embodiment of the downloading operation is disclosed. As shown in FIG. 4A, a droplet-enabled Stock Watcher application 100' includes a selectable droplet handle object, represented as a teardrop-shaped icon 120', located on its title bar. A pointing device (not shown) positions a cursor 300, represented as a hand having a pointing finger, above the icon 120'. The icon 120' is selected by, for example, holding down on a button associated with the pointing device (e.g., a left mouse button). The selected icon 120' is then moved (e.g., dragged) from a window 110' presenting the Stock Watcher application 100' to another location on the GUI by moving the cursor 300 from the window 110' to, for example, a portion 310 of the desktop of the client computer 20 (FIGS. 4B and 4C). The icon 120' is then released by disengaging the pointing device to place (drop) a graphical representation 320 of the Stock Watcher application 100' on the portion 310 of the desktop (FIG. 4D).

While the downloading of interactive links to droplet-enabled application and information is described above with references to FIGS. 4A–4D as preferably including a drag and drop operation, it should be appreciated that the present invention contemplates other means for downloading the links to a droplet-enabled application. For example, a link to a droplet-enabled application may be downloaded to a client computer by invoking a menu command to download a graphical object representing the link or by pressing a combination of keyboard keys at the client computer 20 such as "CTRL" "ALT" and "D."

In one embodiment, the cursor 300 is utilized to initiate a download to the client computer 20 of one of the interactive links in one of two ways. Firstly, and as discussed above with reference to FIGS. 4A–4D, the cursor 300 is positioned above an object representing the link, i.e., the icon 120', by manipulating the pointing device. As the icon 120' is selected to initiate the download, a visual characteristic of the cursor 300 is modified. That is, the hand having the pointing finger (FIG. 4A) is transformed to a cursor 302 where a closed hand encloses the teardrop shaped droplet symbol (FIG. 4B). To further illustrate the capture of the icon 120', the icon 120' is also transformed into a symbol 122 of, for example, an empty circle. As noted above, the cursor 302 is moved about the desktop by holding down on a button of the pointing device and manipulating the cursor 302. Once in a desired location on the client computer 20, e.g., on the desktop (FIG. 4C), the link is loaded to the client computer by releasing the button of the pointing device. Once released, by disengaging the mouse button, the link is loaded to the client computer 20 (FIG. 4D). It should be appreciated that the visual representations discussed above of the cursor 302 and icon 122 are merely illustrative and other visual representations of the selected cursor and icon are contemplated such that when selected, for example, an object may appear in reverse video, a frame may be drawn around the object or "handles" may appear at various corners of the selected object.

Secondly, the icon 120' may be selected by positioning the cursor over the icon 120' using the pointing device, depressing and releasing the button on the pointing device. As is generally known to those of skill in the art, performing a depressing and releasing operation on an object (referred to as "clicking" the object) is a separate operation from depressing, holding and moving an object. In response to the clicking operation, a submenu (generally referred to as a "pop-up" menu) appears at the current cursor location. The pop-up menu includes a list of options for downloading the link to, for example, the desktop or a window on the desktop. It should be appreciated that the list of options for downloading may appear in various manners. That is, each option of the list displayed in the pop-up menu may be represented by text describing the operation (e.g., "download to the desktop", "download to the start menu", etc.), a text label followed by a control such as a radio button or a check box, or a graphic icon. Each of the items is selectable for invoking a specific download operation.

In accordance with one aspect of the present invention, the graphical representation 320 of a droplet-enabled application, i.e., the Stock Watcher application 100, includes information for identifying the application and a symbol that indicates that the application is droplet-enabled. In FIG. 4D, for example, the graphical representation 320 is illustrated as a chart icon 322 and a label 324 entitled "Stock Watcher-." The representation 320 also includes a "tear-drop" symbol 326 for representing that, when selected, the representation 320 invokes a droplet-enabled application, i.e., the Stock Watcher application 100'. Thus, the graphical representation 320 is the link to the remotely stored Stock Watcher application 100'. Preferably, the graphical representation 320 and, in particular, the application identification portion thereof, includes branding information. The branding of graphical representations of droplet-enabled applications and informational content is discussed in further detail below.

While the Stock Watcher application 100 included a single droplet handle object, i.e., the teardrop-shaped icon 120, it should be appreciated that droplet-enabled applications and informational content may include more than one downloadable item (link) for invoking various functional and informational features of the applications stored remotely. The item (link) may be an icon, an image or a string of text that, when selected, invokes a droplet-enabled application or retrieves droplet-enabled information from a remote location on the network.

As should be appreciated by those of skill in the art, the downloading (e.g., improved drag and drop) operation includes steps of interacting with the operating system 80 of the client computer 20 (standard operating system API routines). The interaction permits tracking of the pointing device during a drag and requesting that a file be generated on the target of a drop. When dropped, the file (e.g., files 74 of FIG. 1) is associated to the interactive link (e.g., links 72 of FIG. 1). The file includes information for re-establishing the communication connection 54 to the application server 40 as the link is selected, as is discussed below.

Figure 5:
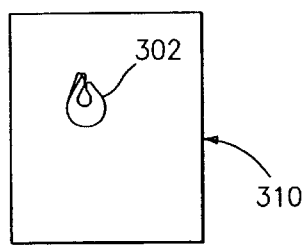
FIG. 5 illustrates a selection of an exemplary, locally stored interactive link and the resulting invocation of a corresponding, exemplary droplet-enabled application.
Figure 5:
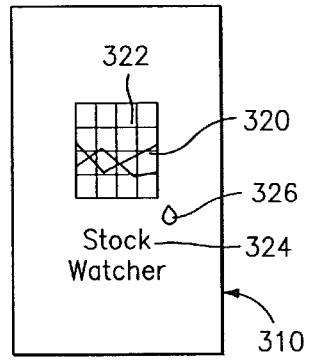
Figure 5:
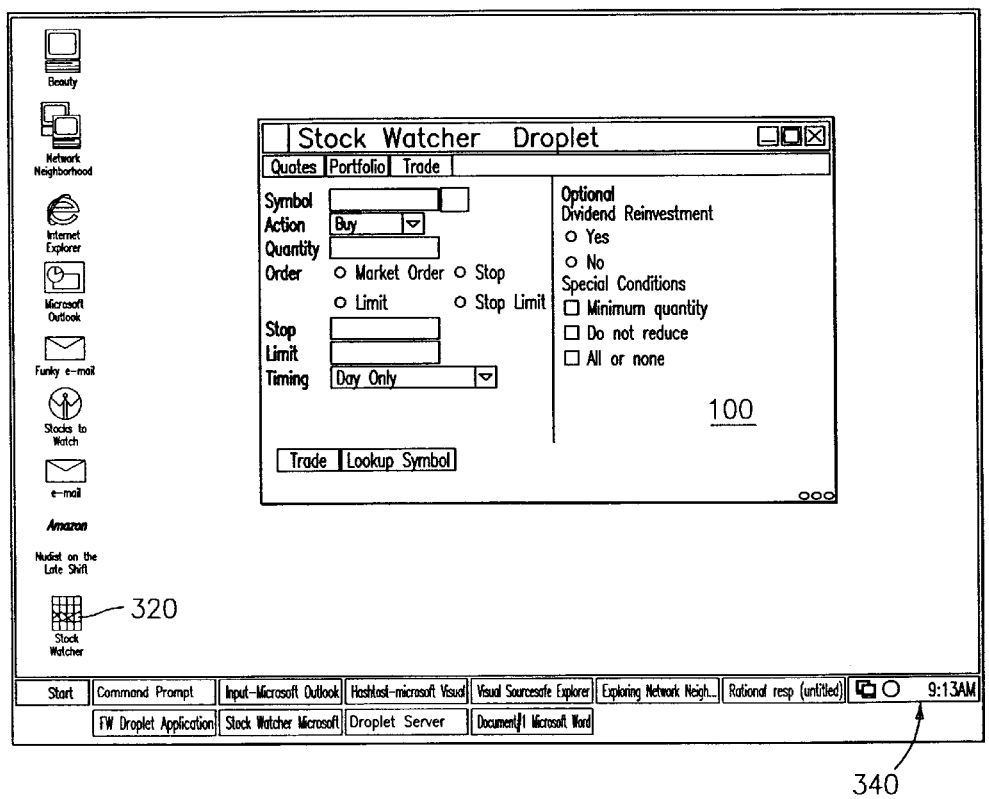

In accordance with the present invention, and as depicted in FIG. 5, selection of the interactive link invokes the droplet-enabled application and/or information, e.g., the selection of the graphical representation 320 invokes the Stock Watcher application 100. That is, selecting the representation 320 (link) triggers the droplet supporting the Stock Watcher application 100 to re-execute on the client computer 20. The droplet, in cooperation with the droplet presentation client 25 and the local operating system 80, re-establishes the communication connection 54 to the application server 40 for invoking and presenting functionality of the droplet-enabled Stock Watcher application 100.

The file generated during the downloading operation is accessed to support the representation operation. As illustrated in FIG. 1, each of the files 74 are associated to a respective link 72 as a result of the downloading operation, e.g., link 1 to file 1 and link 2 to file 2, etc. The files 74 include information identifying the operating environment on the client computer 20, and the identities of the application server 40 to connect with and the server application that is run to present the Stock Watcher application 100 (or other content) to the client computer 20, once the connection is made. Preferably, the details/content of the file are determined by the parameters that embedded the downloadable item (link) into the informational content 36 delivered to the client computer 20. That is, for example, the commands used to add the teardrop-shaped icon 120 into the web page that included the Stock Watcher application 100 include a definition of the file to be created during any downloading operations to load the interactive link to the Stock Watcher application 100 on a local client computer.

In one embodiment, the file 74 includes a location of the application server 40, the application to be run on the server 40, the machine local addresses for the application server 40 and client computer 20, ports (buffers supporting inter-machine communication between processes), and droplet type (e.g., HTML, Java applet, a multimedia object, etc.). As discussed above, the file 74 may also include information to support presentation of the graphical representation 320 (e.g., rendering information, labels, window definitions). The presentational information included within the file 74 overrides the default information provided by the application server 40.

In another embodiment, the files 74 include a location (address) of the content provider 30 that originally delivered the droplet-enabled informational content. Under certain conditions, for example an error in establishing the communication connection 54, the droplet, the droplet presentation client 25 and the local operating system 80 may cooperate to re-establish the communication connection 52 and request redelivery of the informational content 36 that originally provided the link 72.

Accordingly, the present invention provides a mechanism for locally storing links to remote droplet-enabled applications and/or information. For example, FIG. 2 illustrates the web page 110 presenting the droplet-enabled Stock Watcher application 100. As described above with reference to FIGS. 4A–4D and 5, the droplet handle 120 (the link) to the Stock Watcher application 100 was downloaded from the web page 110 and locally stored as the graphical representation 320 on the portion 310 of the desktop of the client computer 20. As should be appreciated by those of skill in the art, the graphical representation 320 of the link is selected by, for example, double clicking the representation 320 with the pointing device. Once selected, the link causes the local operating system 80 to invoke the droplet supporting the droplet-enabled application. That is, the droplet cooperates with the droplet presentation client 25 and local operating system 80 to access the associated file and to re-establish the communication connection 54 to the application server 40 for re-delivering information for re-presenting the Stock Watcher application 100. Importantly, the Stock Watcher application 100 is, in effect, re-executed at the application server 40 to re-present to the client computer 20 the functionality of the Stock Watcher application 100 without having the application 100 locally loaded on the client computer 20 and also without re-navigating back to the web page 110 that originally presented the Stock Watcher application 100 to the user. By eliminating the need to locally store applications and/or to re-navigate to a web page containing a desired application, the present invention avoids two perceived disadvantages of conventional processes for invoking remote applications and retrieving remotely stored information.

Branding of Droplets

In accordance with the present invention, the graphical representation 320 and, in particular, the application identification portion thereof, includes branding information. The branding information includes, for example, a name of the application or institution supporting the application, and a logo or other familiar and easily identifiable symbol of the application or institution. Generally speaking, institutions utilize branding information to uniquely identify a set of products and/or services of the institution in the hope of establishing in the minds of its customers an indication of certain levels of quality and trustworthiness. Branding is generally judged to be important in electronic commerce (e.g., Internet-based transactions) for branding enables customers to find, compare and select reliable businesses from the wide variety of competitive companies offering similar products and services on the web.

By branding graphical representations of droplet-enabled applications and informational content, the supporting or sponsoring institution may establish, for example, a commercially valuable presence on the Internet and, when downloaded, on the client computers. In accordance with the present invention, not only is a locally stored interactive link provided for invoking remotely stored applications and information, but the link may also be visually customized to resemble a commercial image such as, for example a corporation's business name and/or logo.

In one embodiment, for example implemented under the MICROSOFTS Windows™ operating system, the desktop supports the ability to use custom code libraries to render icons for specific file types. The system 10 uses this capability to render application specific icons under Windows™. In Windows™, icon information may be stored in a file. When the desktop needs to draw the icon, it calls a library function that accesses the icon information in the files. The library function reads the file, builds the icon from the data therein, adds branding information (if any) and returns the image to the desktop for rendering. For droplet-enabled applications and/or information, therefore, files are maintained for all icons. The files include, for example, at least the droplet-enabled symbol (the teardrop symbol 326 of FIG. 4D) and, in one embodiment, the file is downloaded from the server 40 as a result of executing the downloading (e.g., improved drag and drop) operation discussed above, and the icon information is included within the file 74.

In another embodiment, for example implemented under the MACINTOSH® MacOS™ operating system, the client operating system natively supports unique icons for each file. On this platform, the icon is assigned when the file is first created, e.g., as a final step of the improved drag and drop operation. Under some circumstance, the proper icon may not initially be defined, e.g., if the file containing the rendering information was copied or dragged from an incompatible system. In those circumstance, when the client invokes the droplet-enabled application, the MacOS™ checks for the existence of a custom icon in the file. If the icon does not exist, it creates one from the icon information within the file.

In another aspect of the present invention, droplet-enabled applications may be "skinned." That is, a "look and feel" of a user interface for a particular droplet-enabled application includes aesthetically appealing or commercially branded visual and auditory characteristics that tend to distinguish the application from other applications running within the network. The visual and auditory characteristics may include, for example, distinctive colors, text fonts, control layouts, graphics or relative sizes and spacing of controls. A "skin" may reflect an advertising or promotional message, a favored item of interest such as, for example, a scene from a movie, video game or landscape. Additionally, the skin may vary characteristics of controls and labels to provide a multi-linqual presentation of a particular droplet-enabled application. That is, the skinning permits an application to be presented in varying languages such as, for example, English, Spanish, German, Italian, etc.

In accordance with the present invention, a skin may be chosen and applied at run-time without requiring a change in the droplet-enabled application's coding or business logic (i.e., the C++, Java, visual basic or other coding used to develop the applications need not be altered). Therefore, skins permit the user interface of a given droplet-enabled application to be customized (e.g., "private-labeled") from one implementation (e.g., website) to another. That is, the customized user interface may be configured as a commercially (branded) or aesthetically appealing interface giving each instance of the droplet-enabled application a desired look and feel. The customization and/or the ability to choose a skin may be provided under the direction of a droplet application developer, website webmaster, or end-user.

In one embodiment, the skin that is applied as functionality of a droplet-enabled application is presented at the client computer 20 is selected from a library of available skins maintained at the content provider 30. A reference to the selected skin may then be downloaded and maintained within the link locally stored at the client computer 20. Alternatively, the skin may be predefined (e.g., hard coded to overrides user preferences) at the application server 40 so that as the droplet-enabled application is presented to the client computer 20 the predefined skin is included.

Transferring Droplets Between Users

In accordance with one aspect of the present invention, droplets may be transferred between users and their respective client computers. For example, the droplet-enabled client/server system 10 includes the ability to transmit a message, e.g., to compose an email message, which contains a droplet™ and an associated link to a remotely stored droplet-enabled application and/or information. Preferably, the message is constructed to substantially ensure that the recipient is able to run the droplet™ and access the droplet-enabled applications or information, regardless of the platform of the receiving machine.

For example, a first user may download a droplet-enabled banner ad from a web site onto their desktop. The droplet-enabled banner ad may include, for example, an application for conducting an informational survey (e.g., a marketing survey) of importance to the sponsoring entity of the web site. In exchange for completing the survey, the sponsoring entity may offer a discounted price on some of its merchandise available for purchase on the web site. The first user considers the discounted price an attractive offer and, therefore, wishes to pass the offer onto associates. In accordance with the present invention, a message is created that includes the droplet-enabled banner ad, the droplet™ and the link to the remotely stored application and/or information supporting the survey (droplet-enabled survey application and/or information). The message is transmitted to associates of the first user. Depending on capabilities of the associates, or more precisely, on the client computers used by the associates, the droplet-enabled survey application and/or information may be immediately accessed and utilized by the associates.

In the present invention, the system 10 includes at least one of three possible strategies for transmitting and running applications on the associate's client computers, hereinafter referred to as a recipient computer. In a preferred embodiment, each of the three strategies is included within, for example, a message transmitting the link and, depending on the capabilities of the recipient computer, one of the three strategies may be employed to successfully receive the application.

Firstly, the transmitting message (e.g., email message) may include a droplet-enabled application and/or information in a file format as an attachment. If the recipient computer is droplet-enabled, i.e., operating in a similar way as client computer 20 wherein the droplet presentation client 25 is locally installed, then the attachment appears as a known file type and the recipient may open the droplet-enabled application and/or information file immediately. Once opened, the link to the droplet-enabled survey application may be downloaded (e.g., dragged and dropped) on the recipient computer. As a result, the file attachment is copied onto a desktop or other location on the recipient computer (e.g., the "start" menu). Once downloaded, the link (e.g., graphical representation 320 of the link) may be selected to initiate the communication connection 54 to the application server 40 so that the droplet-enabled survey application and/or information may be executed and/or retrieved as discussed above.

In a second, exemplary implementation where the recipient computer is not droplet-enabled, the droplet-enabled survey application and/or information may be transmitted between parties by transmitting a message (e.g., an. email message) containing a hypertext link to a web page. The web page includes a link for launching a web browser and for guiding the user through the process of droplet-enabling the recipient computer. That is, the web browser receives instructions for downloading the droplet presentation client 25 and links to the droplet-enabled survey applications and/or information.

In a third exemplary implementation, a message (e.g., email message) that transmits the droplet-enabled survey application and/or information includes a link to a web page that contains the droplet-enabled survey application and/or information as an embedded object thereof. This method is similar to the methods of retrieving droplet-enabled application and information discussed above with reference to the Stock Watcher application 100, with the exception that the recipient is directed specifically to the web site of interest without having to navigate to the site on their own. This implementation assumes that the web browser used by the recipient has the ability to host Java applets.

Figure 8:
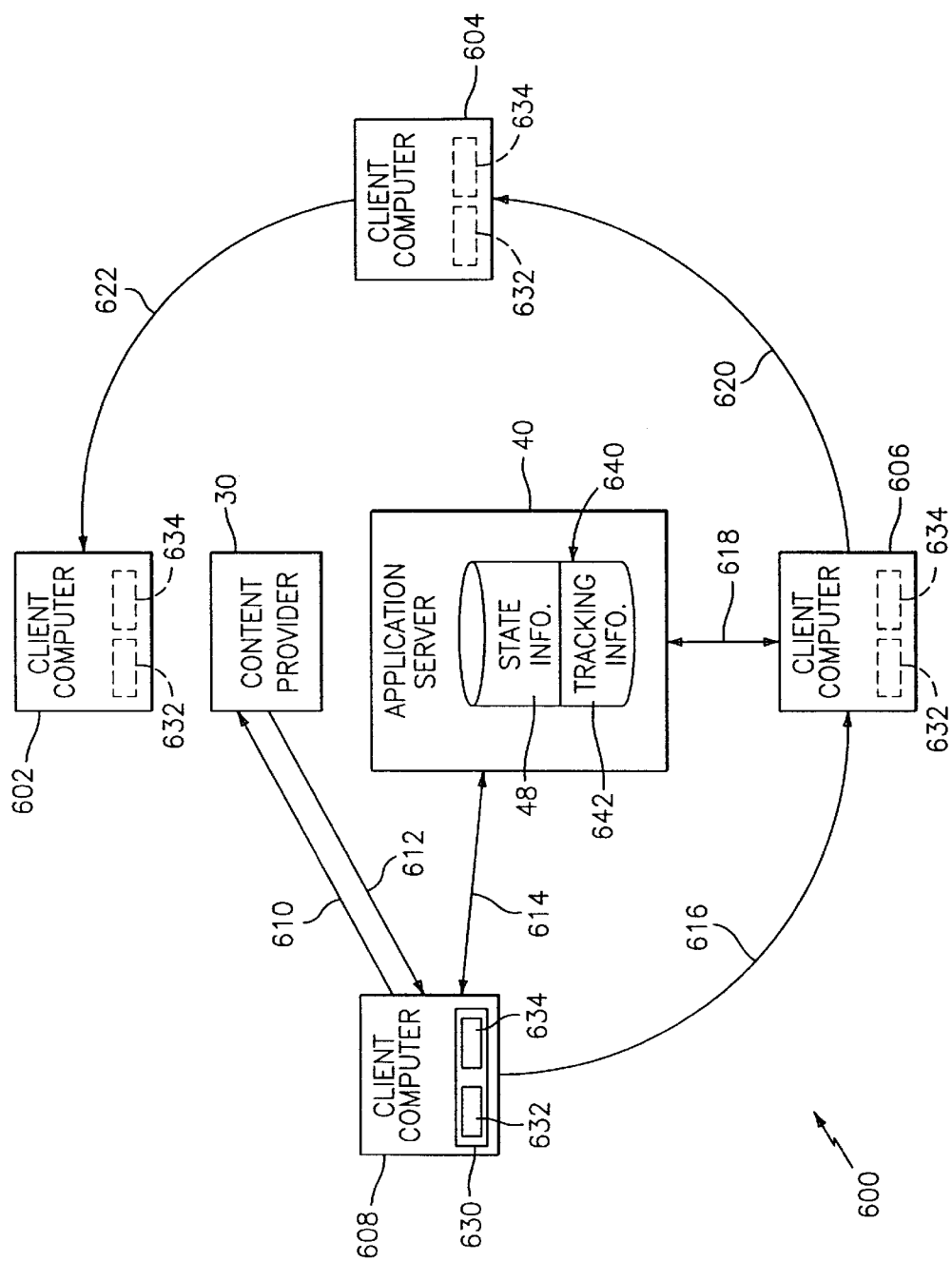
FIG. 8 is a simplified block diagram of the exemplary droplet-enabled client/server system constructed and operating in accordance with one embodiment of the present invention.

FIG. 8 is a simplified block diagram of a droplet-enabled client/server system 600 configured and operating in accordance with the present invention. In particular, FIG. 8 depicts two host computers (e.g., the content provider 30 and the application server 40) servicing requests for droplet-enabled applications and information from a plurality of client computers 602–608. The droplet-enabled applications and information are provided to a client computer either directly from the host computers 30 and 40 or droplets and links to the applications and information are transferred from another client computer. As the direct host-to-client delivery process has been described in detail above, reference is made generally to the process of transferring droplets and links by and between the client computers 602–608.

In FIG. 8, client computer 608 requests informational content from the content provider 30 (via a message 610). In response, the content provider 30 provides the requested informational content 630, which includes, e.g., a link 632 and a droplet™ 634 embedded therein (via message 612). Upon receipt, the droplet™ 634 executes on the client computer 608, and in cooperation with a droplet presentation client and the local operating system (not shown), establishes a communication connection 614 to the application server 40. The application server 40, in turn, presents (over the communication connection 614) to the client computer 608 the functionality of the droplet-enabled application, including information for presenting the application. The link 632 may be locally stored to selectively re-establish the communication connection 614 and re-present the droplet-enabled application. As described in detail above, this process represents the first method of presenting functionality of droplet-enabled applications and/or information to a client computer.

FIG. 8 also illustrates a second mechanism wherein droplets and links to droplet-enabled applications and/or information are transferred by and between the respective client computers 602–608. For example, the link 632 and droplet 634 downloaded to client computer 608 are transferred, via message 616, to the client computer 606. Once received and stored, the link 632 and droplet 634 (shown in dashed-lines to illustrate that the link 632 and droplet 634 were not downloaded directly to the client computer 606) may be selected to establish a communication connection 618 to the application server 40 whereby the droplet-enabled application and information for presenting the application may be passed to client computer 606. Similarly, the link 632 and droplet 634 may be passed from client computer 606 to client computer 604, via a message 620, and from client computer 604 to client computer 602 via a message 622. As should be appreciated, the passing of links and droplets facilitates the retrieval of droplet-enabled applications and/or information without requiring the user of a client computer to navigate to the content provider 30 that originally provided the link and droplet for the droplet-enabled application and/or information. In many respects, the second mechanism for presentation provides a more advantageous method of sharing network applications and information among a group of client computers than the first mechanism wherein each client computer with the group individually navigates to and downloads unique instances of links and droplets of droplet-enabled applications.

Securing Droplet-enabled Application and/or Information

As generally discussed herein, a link to droplet-enabled applications and/or information is selected to invoke a unique instance of the application and/or information stored at a remote location on a network. In other words, each request for execution of a droplet-enabled application or retrieval of droplet-enabled information is satisfied by providing an individual copy (instance) of the requested application and/or information.

However, in accordance with one aspect of the present invention, a secured and individually identifiable instance of droplet-enabled applications and/or information may be shared and transferred between multiple client computers. That is, the present invention provides a keyed instance of a droplet-enabled application having a unique identification field referred to herein as a global unique identification field (GUID). The keyed instance may be transferred between one or more client computers such that information accessed and stored from within the keyed instance may be modified only by client computers that invoke the keyed (identification field specific) instance of the droplet-enabled application. The keyed instance is, in effect, secured such that only users knowing a value of the GUID field may specifically request and access the individual instance of the secured droplet-enabled application and/or information.

For example, the client/server system 10 includes a secured, or keyed, droplet-enabled photo-album application. A first user enters personal photos into a uniquely identifiable instance of the photo-album application, which has a GUID field of value "GUID 1." The first user's photo images are stored in a remote network location, as are all instances of the photo-album application. A second user requesting the photo-album application receives another uniquely identifiable instance of the application and can not view the first user's photos, unless the second user provides the value of the GUID field corresponding to the first user's instance of the photo-album application. The present invention contemplates several methods by which the GUID field is provided to a user.

In one example, the first user transfers the photo-album application to another user, e.g., a third user. That is, the first user composes an e-mail message including a link and droplet to the uniquely identifiable instance of the photo-album application, which has a GUID field of value "GUID 1". The link is downloadable and includes the GUID field of value "GUID1" for selectively invoking the unique instance of the photo-album application. In this way, the first user grants access to its personal photos to the third user while substantially prohibiting others (e.g., the second user) from viewing them.

In another embodiment, the first user may view the GUID field and pass it directly to the second, third or both users. When requesting a keyed droplet-enabled application, the system 10 queries the user (e.g., the second or third user) as to whether they want a new instance or a secured instance of the application. If a secured instance is requested, the system 10 prompts the user to enter the identification field value corresponding to the secured application (e.g., GUID1).

Tracking Droplet Dispersion Information

As noted above, each instance of a droplet is associated to a global unique identification field (GUID). As illustrated in FIG. 8, a data store, shown generally at 640, is maintained at the application server 40 for storing tracking information 642 relating to usage of droplet-enabled applications and/or information. The data store 640 includes, for example, a database, file, link list, or similar storage feature, that contains the GUID and information regarding each client computer 20 that has received links and droplets for droplet-enabled applications and/or information.

By accessing and retrieving the tracking information 642 within the data store 640, droplet dispersion data can be provided upon request. The droplet dispersion data identifies paths that links and droplets of droplet-enabled applications and/or information have taken throughout the system 600. Therefore, the data identifies the links and droplets that are transferred from one user, or client computer, to another (e.g., transmitted via an email message) as well as that are directly accessed and downloaded to client computers from, for example, web sites or imbedded within stand-alone programs.

The tracking information 642 can be used for many purposes, for example, to track the relative success of a promotional campaign. Additionally, the tracking information 642 can be used to report the number of users a droplet-enabled application has reached from a specific, original user.

The tracking information 642 also includes information detailing usage aspects of particular droplet-enabled applications. For example, the tracking information 642 includes information as to when (e.g., time and date) links and droplets corresponding to a droplet-enabled application were downloaded to a client computer, how often (number of times) an application was invoked and for how long each time, what application functionality was utilized during a session, how long an application remained active and visible on a client computer's desktop, how often the application was obscured by another application or minimized, and when the links and/or droplets of the droplet-enabled application were deleted or erased from the client computer.

Generally speaking, a merchant or sponsoring entity of a droplet-enabled application or website providing a droplet-enabled marketing application (survey) may utilize this tracking information to determine, for example, usage patterns of users or to target promotions to users having a link and a droplet corresponding to the droplet-enabled application (such as a droplet-enabled shopping application having a particular item of inventory) resident on its computer for a predetermined period of time. The targeted promotion may, for example, offer a discounted price to move the client toward a decision to purchase the item of inventory.

Preferably, the tracking information provided to merchants or sponsoring entities is anonymous (e.g., does not specifically identify a particular user by name or machine address). Moreover, the tracking information may be provided in a real-time manner by utilizing the communication protocol and message format discussed above.

Alternatively, the tracking information may be utilized by droplet application developers to optimize performance of the droplet and/or to evaluate user interest as to particular functionality with the droplet-enabled application.

Providing a Ubiquitous Event Channel

Figure 6:
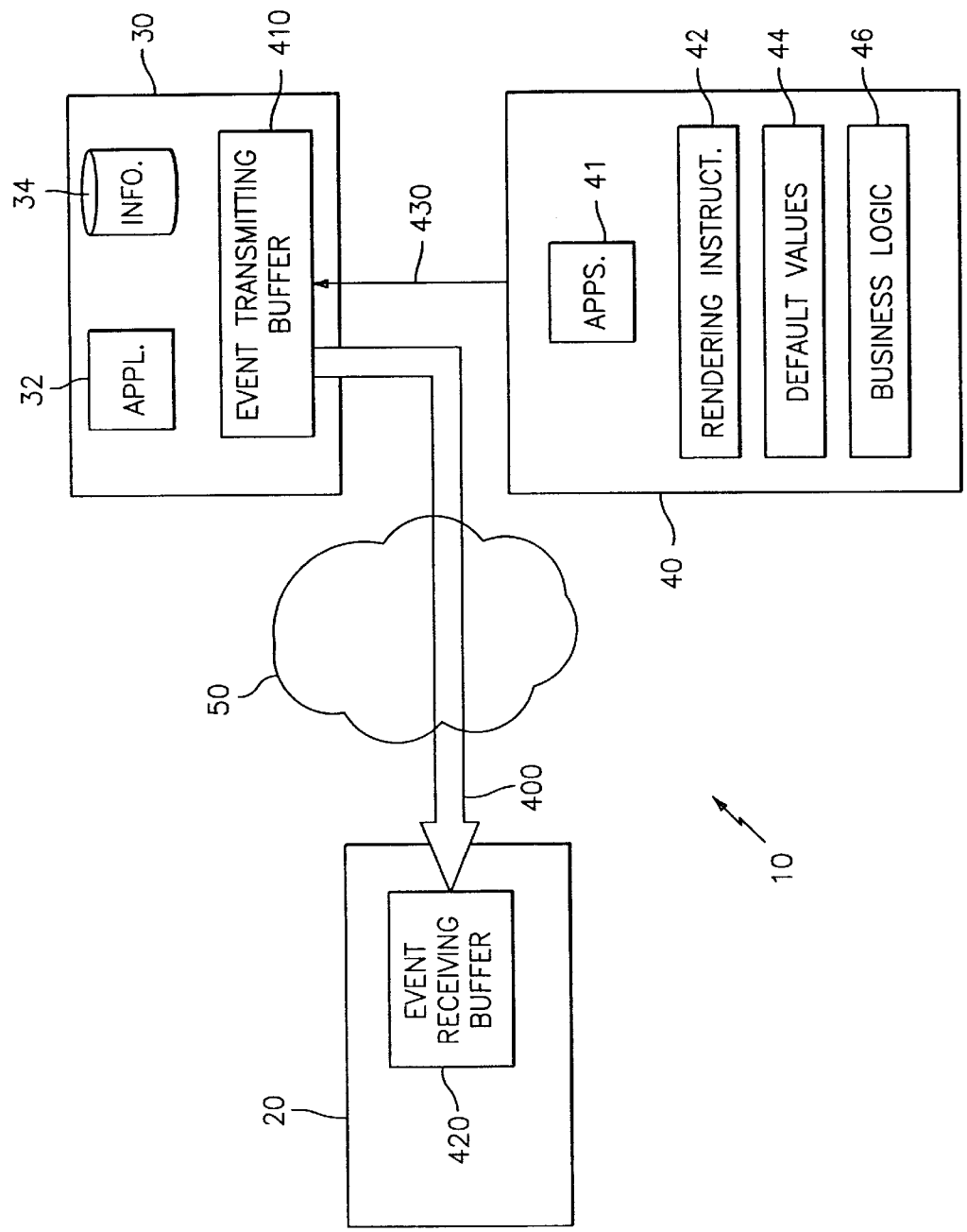
FIG. 6 is a simplified block diagram of the system of FIG. 1 wherein an event channel communication scheme is particularly highlighted.

In one aspect of the present invention, illustrated in FIG. 6, the client/server system 10 includes an event channel 400 for transmitting information to all clients of the system 10, all clients that have downloaded a link and droplet of a particular droplet-enabled application or a specific client computer, for example, the client computer 20. The information includes, for example, sounds, images, text or any combination thereof, transmitted to users to notify them of an occurrence of an event. The notification to the users may be in real-time (upon the occurrence of the event) or at a predetermined, regularly scheduled time period.

In one embodiment, for example, a droplet-enabled e-mail application is provided. In this embodiment, messages are transmitted over the event channel 400 to notify a user of the receipt of an e-mail message. The event channel 400 permits the receipt of messages whether the e-mail application is actively executing or is not. Preferably, and when the e-mail application is not actively executing, the event channel notifies the user of the receipt of a message by flashing or blinking an icon associated to the e-mail application (e.g., icon 320 for the Stock Watcher application 100) on the desktop of the user's client machine. In this respect, the droplet presentation client includes an alarm application. The alarm application periodically evaluates the event receiving buffer 420 at the client computer 20 for messages such as, for example, an "email received" notification message as discussed above. In response to a received message, the alarm application alerts a user of the client computer by, for example, utilizing features of the user interface to blink an icon, activate a sound, or launch a pop-up message or menu. Alternatively, in a MICROSOFT® Windows™ Tm environment, an envelope symbol or icon representing that the message was received is presented in the "tool tray" portion 340 of the desktop (FIG. 5).

The implementation of the event channel 400 requires the cooperation of the client computers, a central event server and application servers spread over the network 50. In FIG. 6, the central event server is implemented within the content provider 30, although it should be appreciated that other implementation strategies are contemplated. The content provider 30 includes an event transmitting buffer 410 operatively coupled to each application server, for example the application server 40, and event receiving buffers within each client computer, for example an event receiving buffer 420 within the client computer 20.

In one embodiment, platform specific software for the client computers, the central event server and the application servers may be installed locally or accessed through a link to a droplet-enabled version thereof. On the client computers, the software permits a user to individually grant the server applications access to its event receiving buffer 420. The client software also provides a view of event history, that is, permits the client to recall previously transmitted information (sounds, images, text or any combination thereof).

Once an application (e.g., a droplet-enabled application 41 executing on the application server 40) is authorized by one or more users, the application 41 posts events by transmitting a message to the transmitting buffer 410 of the central event server (e.g., message 430 from the application server 40 to the content provider 30). The message 430 includes, for example, the details of the posted event as well as information identifying the user or users that are to receive the event. The message is then delivered by the central event server to specified clients along the event channel 400.

Preferably, a user may invoke an application by selecting the event information originating from the application. Additionally, application specific information may be transmitted whether the application itself is active or not.

The ubiquitous event channel 400 provides a mechanism by which a droplet-enabled application provider, developer or sponsoring entity may selectively notify a user or users of the droplet-enabled application that new or revised content is available. In one embodiment, the provider, developer or sponsoring entity can transmit a notification event to all users or a particular user of a droplet-enabled application based on, for example, a pattern of usage of the application. In another embodiment, users of client computers 20 may poll or otherwise evaluate the event channel at a predetermined time period to determine whether new or revised information pertinent to a droplet-enabled application loaded therein is available.

In an exemplary interactive, droplet-enabled shopping application provided on a website, a user downloads the application and an item of inventory onto their desktop. As noted above, tracking information may be provided to the entity sponsoring the shopping applications. If a purchasing decision is delayed, pricing and availability information pertaining to the item of inventory may changes. By utilizing the tracking information and the event channel 400, a notification message containing the revised pricing and/or availability information may be transmitted to the user. Alternatively, the entity sponsoring the shopping application may wish to favorably influence the user to buy the item of inventory and, therefore, may transmit a notification message having a discounted price to the user over the event channel 400. According to the present invention, such a targeted promotional message transmitted via the event channel 400 would be received at the user's client computer whether the shopping application is currently executing or not.

Persistent State Maintenance

The present invention provides capabilities for re-establishing a previous operating state of a droplet-enabled application. For example, when a user re-establishes a session with a droplet-enabled application, the state of the application is restored to what it was when the user ended the immediately prior session.

In accordance with the present invention, the application server 40 maintains state information 48 regarding current operating states of each droplet-enabled application in the data store 640 on the application server 40 (FIGS. 1 and 8). The state information 48 is kept after the application is terminated. The state information 48 includes a user identification field such that operating state information 48 for a particular user is retrievable from the data store 640. It should be appreciated that the present invention contemplates a sign-on procedure or similar mechanism wherein a user registers prior to beginning a session. Accordingly, state information corresponding to a operating session of the user may be identified by a user id or the like. As registration procedures are generally known, further details of the procedures are not further discussed herein. Rather, it should be appreciated that such a registration procedure is within the scope of the present invention.

When the same user re-invokes a droplet-enabled application, the state information 48 corresponding to each application the user executed during their last session is reviewed and the state information 48 pertaining to the re-invoked application is retrieved from the data store 640. The retrieved state information 48 is delivered to the user as the droplet-enabled application is presented to the client computer 20. In one embodiment, the user is given an option of re-loading or not re-loading the state information 48 corresponding to the last session. As the state information 48 is maintained on the application server 40 and identifiable by an association to a user's registration information, the state information 48 is provided regardless of client computer 20 that a current and the prior operating session were run on. Therefore, even if a user re-invokes a droplet-enabled application from another client machine, the previous state information 48 is accessible and may be provided to the user upon request.

For example, and referring again briefly to FIG. 8, a user first logs on to (registers with the system 600) and invokes the Stock Watcher application 100 at a personal computer in their office, represented as the client computer 608. During this session, the user alters the size of the window presenting the Stock Watcher application 100 and adds a number of personal stock offerings to a list of "watched" stocks under the Stock Watcher application 100. As should be appreciated, the state information 48 is stored in the data store 640 and accessible by referring the user's identification field. The user terminates the current execution of the application 100 and logs off the client computer 608. Later, the user is traveling and has an opportunity to check on the status of the watched stocks. The user re-invokes the Stock Watcher application 100 from a portable electronic device such as, for example, a laptop personal computer, represented as the client computer 606. Because the user had previously transferred a link (e.g., link 632) to the Stock Watcher application 100 at the client computer 606 and, the user can establish the communication connection 618 for retrieving the Stock Watcher application 100. In accordance with the present invention, the state information 48 corresponding to the previous execution of the application 100 at client computer 608 is retrieved from the data store 640 and presented to the user at client computer 606. As a result, the resized window presenting the Stock Watcher application 100 and the newly added personal stock offerings are presented to the user. Accordingly, the present invention avoids a perceived disadvantage in conventional state tracking methodologies, for example, the cookie technology outlined in the Background Section of this Specification. As discussed above, the conventional methodologies are limited in that prior state information is generally stored on the client computer 20 that previously invoked the session and, therefore, modifications made to an application invoked by a user at one client computer are not apparent when the user the user re-invokes the same application at another client computer.

Preferably, the operating session state information 48 includes sizes and locations of open windows and controls, the position of the cursor within the application, any completed or partially completed data field values, and data fields or items of, for example, inventory selected by the user during the previous session. Preferably, the application server 40 stores the state information 48 in a long-term storage device to ensure that a prolonged delay in user activity may be accounted for. Additionally, a standard API is defined for creating a storable packet of information representing the complete state of a droplet-enabled application. Also, the software running on the client computers 602–608 must be capable of responding to requests (made under the communication protocol outlined above) to create windows and to move the selection.

If an operating session between a user and a droplet-enabled application is active and the user attempts to establish another session with the same droplet-enabled application, the system 600 identifies a conflict. That is, a message is transmitted and displayed on the client computers 602–608 providing the user the option of either terminating the attempted new session and resuming the existing session, or terminating the existing session and initiating the new session.

In order to identify concurrent operating sessions the system 600 (and system 10) stores a flag indicating that a particular user already has an open session with a particular application. When a user attempts to connect to a new application, the system 600 checks for the value of the flag. If it is set, the system 600 offers the choice to terminate the existing session or create a new one. If the user chooses to terminate, the system notifies the running application that it has been terminated. If the user chooses to start a new session, the system 600 stores a flag indicating the choice. Preferably, the flag includes a timestamp to uniquely identify sessions. If the user attempts a connection and there are multiple active sessions, the user is given the option to terminate any one of them.

Mirroring the Desktop Application on to a Webtop

In accordance with the present invention, a webtop is a password-protected personal repository, e.g., an account on a web site, for storing links to droplet-enabled applications and information commonly used by authorized users of the account. The links include addresses of servers and names of the processes executed thereon in support of the applications and information in the account.

As a link to a droplet-enabled application and/or information is copied to a client computer 20, e.g., added to the desktop, within a window, or to a menu exhibited on the desktop, then the link may also be copied or "mirrored" to the user's webtop. Preferably, the mirroring behavior is under the user's control. That is, a user may specify that the mirroring should happen all the time, never happen or that a message should ask the user whether they want to mirror the link to the user's webtop. If an option is selected to mirror links to the webtop without any interaction with the user, the information necessary to access the webtop account, i.e., an authorized user's name and password, is encoded within the mirroring process.

In a preferred embodiment, the mirroring process is performed regardless of the method used to store the link to the droplet-enabled application or information on the desktop. That is, whether a link is downloaded by dragging a droplet handle out of a web page or by choosing a menu command to add it, mirroring may be invoked. In one embodiment, the user may choose to record a link in their webtop without adding the link to the desktop. Also, the mirroring process distinguishes between instances of the same application served by different servers.

As a user visits their webtop account, the applications stored for that user are presented in groups. Preferably, applications added are automatically put in a "New Applications" group. Users have the option to create new groups and move applications according to their preferences. In one embodiment, there is a web interface on the webtop that enables a client to register that an application should be added to a particular user's repository.

Multiple Platform Implementation of Droplets

As discussed above, droplet-enabled client computers 20 include the droplet presentation client 25. In accordance with the present invention, the presentation client 25 is a generic, platform independent application program that processes user interface specifications received from the application server 40 and routes user driven events back to the application server 40 utilizing the message formats (e.g., event notification and session commands) discussed above.

As the droplet presentation client 25 is platform independent, one instance of the droplet presentation client 25 can execute all instances of droplet-enabled applications whether downloaded from a web page or a standalone application running on the desktop. However, the implementation of the droplet presentational client 25 may differ over various hardware and software platforms. For example, the droplet presentation client 25 is designed to cooperate with many web browsers of differing vendors, operates on non-personal computer platforms such as PalmPilots, internet-enabled radio telephones, Netpliance™, 1-Openers™, tablet computers and others. The presentation client 25 also is designed to operate on multiple computer platforms such as personal computers running Windows™ or Linux operating systems, Apple Macintosh and Sun Solaris work stations. Additionally, the server computers 30 and 40 operate on multiple hardware and software platforms such as, for example, Windows NT and Unix server platforms.

In a web based implementation (within a web page), the droplet presentational client 25 is preferably implemented as a Java applet, an ActiveX component, or as a browser plug-in. Each of these implementation technologies presents an interface that is embedded in a web page. The parameters of the HTML tag used to include the droplet presentational client 25 provides the server to connect to and what application to request to the presentational client 25.

In a desktop based implementation, the droplet presentational client 25 is implemented as a standard native executable. The presentational client 25 is launched as the droplet link is invoked and the presentational client 25 receives information from the link, i.e., from a file associated to the link, that tells the presentational client 25 which server to connect to and what application to request.

Security Features

The droplet-enabled client/server system 10, configured and operating in accordance with the present invention, includes security capabilities for password and encryption-protected storage and transmission of information, that is, information transmitted within the communication protocol, message format and event channel, discussed above, between the client computers 20 and server computers, e.g., 30 and 40.

To substantially protect misappropriate of passwords, passwords are digested prior to transmission by using MD5 or similar conventions. Similarly, within applications that request passwords, hashing is performed as passwords are not transmitted in plain text, even on encrypted channels. When a password must be typed into a system, the characters are cloaked, i.e., each character display is represented by an asterisk.

Encryption routines are used within the system 10. As part of an initial protocol negotiation between client and server, the server may specify that some or all of the transmissions may be compressed. Where processing power constraints are not prohibitive, the system 10 uses SSL as a standard mechanism to establish common keys. Where processing power constraints are at issued, alternative mechanisms and encryption algorithms may be substituted such as, for example, HTTP tunneling. Substitute algorithms are subject to security review and must be as reliable as the primary algorithm.

It should be appreciated that transmitted messaging within a particular droplet-enabled application may be selectively secured or unsecured, at the option of, for example, the droplet application developer or user of the application. Also, the level of security, for example, 1-bit, 30-bit or 128-bit encryption, is selectable at run-time. That is, sensitive information may be transmitted over secured channels, while less sensitive information is transmitted over less secured channels. As is known to those in the art, there are direct relationships between the levels of security and the constraints imposed on the network configuration and desired network performance.

Developing Droplet-Enabled Applications

Those skilled in the art should appreciate that developing a droplet-enabled application is similar to developing a GUI or desktop application using conventional component based architectures. Well-designed desktop applications isolate routines for processing user interface, business logic and data storage functions into modules. The separation of user interface, business logic and data storage functions into modules affords a greater portability across differing platforms. For example, modifications can be made to the user interface module to account for hardware specific requirements without affecting the business logic and/or data storage modules. Droplet-enabled applications, constructed in accordance with the present invention, include this layered or module approach to application development.

Figure 7:
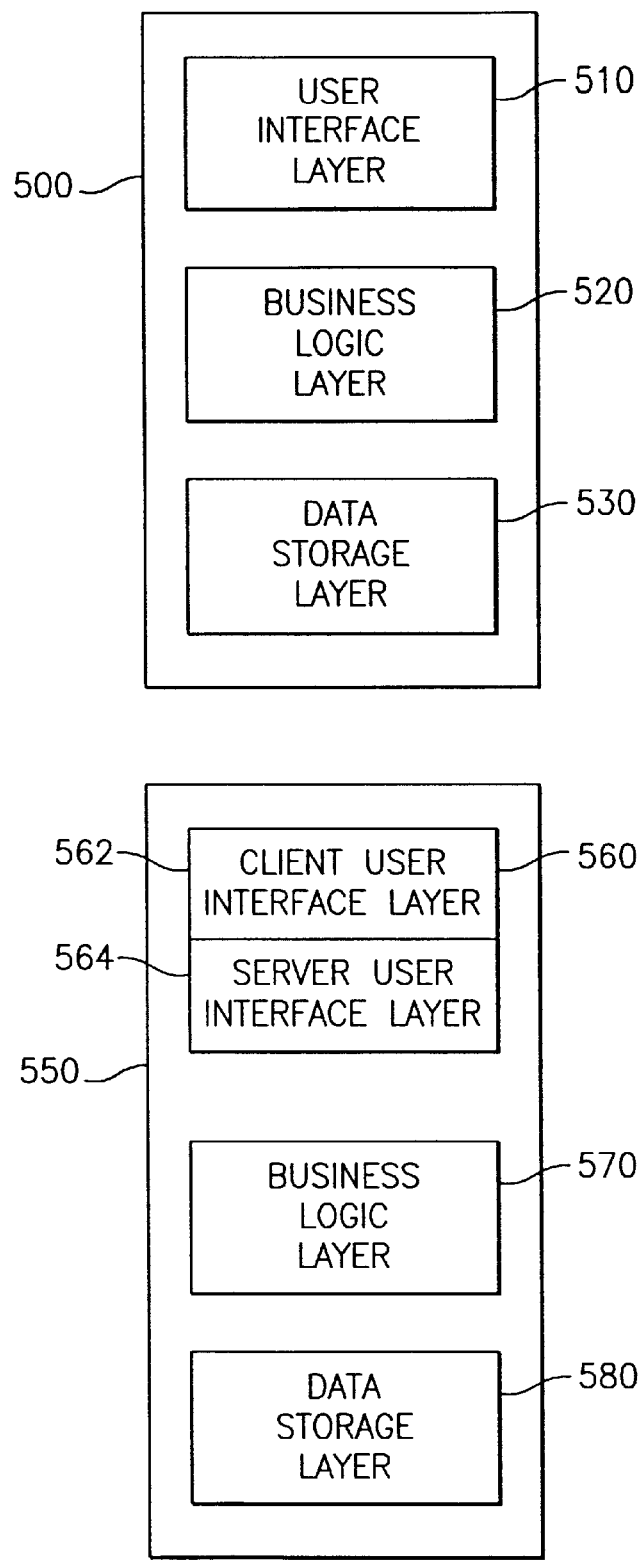
FIG. 7 illustrates a logical structure of an exemplary droplet-enabled application as compared to conventional application structure.

FIG. 7 illustrates logical layers of a conventional application 500 as compared to that of a droplet-enabled application 550. As is shown, the conventional application 500 includes a user interface layer 510, a business logic layer 520 and a database or data storage layer 530. The droplet-enabled application 550 includes a user interface layer 560, a business logic layer 570 and a database layer 580 that execute on an application server and provide functionality to an invoking client computer.

The business logic layers 520 and 570 and the data storage layers 530 and 580 of the conventional application 500 and droplet-enabled application 550 are substantially similar. A difference in the layered approaches of the applications 500 and 550 is that the user interface layer 560 of the droplet-enabled application 550 includes two components, a client user interface 562 and a server user interface 564. The client user interface 562 executes on the client computer 20, while the server user interface 564 executes, with the business logic layer 570 and data storage layer 580, on the application server 40. Application drivers within the server logical layers (564, 570 and 580) utilize the network communication protocol (i.e., event notification messages, update and window command messages) such that droplet-enabled applications executing on the application server 40 appear to the user to be executing at the user's client computer 20. For example, the application drivers provide instructions for rendering graphical objects, default parameters or data values displayed within the droplet-enabled application 550 to the client user interface 562.

It should also be appreciated that an application that includes the above-described module or layered approach may be rewritten as a droplet-enabled application without substantial rewriting of existing codes. That is, the existing application user interface layer need only be modified.

Preferably, droplet-enabled applications are deployed as dynamically loadable libraries that, once invoked locally by a client computer, are loaded and run under the control of application drivers on a remote server such as, for example, the application server 40. The droplet-enabled applications and the application drivers are preferably written in the Java, C++, Visual Basic, or other equivalent programming languages that support COM or CORBA interfaces. Also, the droplet-enabled application is implemented as an object that is instantiated at startup, holds all program information while active, and causes the application to terminate when the object is destroyed. By instantiating many such objects within a single application server, the server can serve any number of users running independent instances of the same application from the same server.

Conclusion

While the invention has been described and illustrated in connection with preferred embodiments, many variations and modifications, as will be apparent to those of skill in the art, may be made without departing from the spirit and scope of the invention. By example, and as discussed above, the teachings of this invention are not intended to be limited to any specific method of providing interactive links to applications and/or information stored at remote locations over the network. That is, it should be appreciated that the features disclosed herein are not limited to application in an Internet or web based system.

For example, it should be appreciated that the client computer 20 may be any type of computing device such as a personal computer, work station, portable or handheld device, or the like. In a preferred embodiment, the client computer 20, the content provider 30 and the application server 40 are operatively coupled over a packet-switched network such as, for example the Internet, having wired and wireless interconnections between devices.

Additionally, the preferred embodiment of the present invention includes two server computers, the content provider for providing informational content and the application server for providing droplet-enabled applications and information including rendering instructions, default data values and application-specific business logic to the droplet-enabled applications. It should be appreciated that it is within the scope of the present invention for one server computer to provide these services and functionality. That is, the content provider may include hardware and software resources for providing the droplet-enabled applications and information including the rendering instructions, default data values and application-specific business logic to the droplet-enabled applications. In this embodiment, the two network connections discussed above as communication connections 52 and 54 may physically be one connection that satisfies two logical functions as illustrated herein.

Accordingly, the invention as set forth in the appended clams is not limited to the precise details of construction set forth above as such other variations and modifications as would be apparent to one skilled in the art are intended to be included within the spirit and scope of the invention as set forth in the defined claims.

What is claimed is:

1. In a network configured computer processing system having a plurality of client computers and a plurality of host computers, a method for delivering interactive links for presenting applications and information from remote sources on the network, the method comprising:

retrieving, in response to a request of a client computer, over a first communication connection first information having computer program code embedded therein and executing the embedded computer program code for establishing a second communication connection to a second host computer;

sending second information relating to the operating environment of the client computer, from the client computer to the second host computer;

retrieving, over the second communication connection, third information including presentation information for presenting an application and fourth information, the presentation information being based on the second information;

presenting, at the client computer, the application and the fourth information based upon the presentational information; and storing, on the client computer, an interactive link for selectively re-establishing the second communication connection to the second host computer for retrieving the third information and presenting the application and the fourth information.

2. The method as claimed in claim 1, wherein the presentational information includes at least one of instructions for rendering components of the presented application, default parameters and data values exhibited within the components, and application-specific business logic for processing input to the presented application.

3. The method as claimed in claim 1, comprising:

downloading to the client computer a graphical representation of the interactive link;

associating, at the client computer, the graphical representation with a file containing information representing the operating environment of the client computer and a network address of the second host computer; and displaying the graphical representation on the client computer.

4. The method as claimed in claim 3, comprising allowing a user of the client computer to drag and drop the graphical representation onto the client computer.

5. The method as claimed in claim 3, wherein the graphical representation includes information for identifying the presented application and the fourth information invoked by the interactive link and a symbol for indicating that the graphical representation is of an interactive link.

6. The method as claimed in claim 5, wherein the information for identifying is comprised of at least one of an icon and a label representing a commercially recognizable brand name of at least one of the presented application and the fourth information.

7. The method as claimed in claim 5, wherein the symbol is comprised of a teardrop-shaped symbol.

8. The method as claimed in claim 3, wherein the file further contains instructions for rendering components of the presented application, default parameters and data values exhibited within the components, and application-specific business logic for processing input to the presented application, and wherein the instructions override at least a portion of the third information retrieved from the second host computer.

9. The method as claimed in claim 3, comprising:

the user selecting the graphical representation; and in response to the selection, accessing the contents of the file associated with the graphical representation and reestablishing the second communication connection to the second host computer for retrieving the third information and presenting the application and the fourth information associated to the interactive link.

10. The method as claimed in claim 9, comprising:
storing, at the second host computer, information representing a first operating state of the application and the fourth information presented to the user; and in response to the selection of the graphical representation, presenting the first operating state information as the application and the fourth information are again presented to the user.

11. The method as claimed in claim 10, wherein the first operating state information is presented to the user at any one of the plurality of client computers.

12. The method as claimed in claim 1, comprising transmitting a copy of the interactive link to a next client computer such that the next client computer is operable for selectively establishing a communication connection to the second host computer for retrieving the third information and presenting, at the next client computer, the application and the fourth information.

13. The method as claimed in claim 12, comprising storing information for tracking transmissions of interactive links between the plurality of client computers.

14. The method as claimed in claim 13, wherein the information for tracking comprises a global unique identifier that is assigned to the interactive link and information for identifying each client computer that has received the interactive link.

15. The method as claimed in claim 1, wherein the network configured computer processing system includes an Internet connection and the client computer includes a desktop-based repository for links to the present applications and the fourth information and an Internet-based repository for the links, and wherein the storing of the interactive link comprises selectively storing the interactive link in one of the desktop-based repository and the internet-based repository.

16. The method as claimed in claim 1, wherein the network configured computer processing system includes an Internet connection and the client computer includes a desktop-based repository for links to the presented applications and the fourth information and an Internet-based repository for the links, and wherein the storing of the interactive link comprises storing the interactive link in both of the desktop-based repository and the internet-based repository.

17. A network configured computer processing system, comprising:
a plurality of client computers, each having an application program code, an operating system program code and a presentation client program code operating thereon, said application program code for requesting informational content stored remotely across said network;
a first server computer for storing said informational content, a predetermined portion of said informational content having computer program code embedded therein, said first server for delivering said informational content in response to requests from said client computers;
a second server computer for storing applications and second information invoked by said embedded computer program code and first information including presentational information for presenting said invoked applications and second information, the presentational information including information relating to the operating environment of a requesting client computer;
a communication connection established between the requesting client computer and said second server by said operating system program code, said presentation client program code and said embedded computer program code, said communication connection for receiving said first information and for presenting said invoked application and said second information at said requesting client computer; and
an interactive link, stored at said requesting client computer, for selectively re-establishing said communication connection for receiving said first information and for presenting said invoked application and said second information from said second server computer.

18. The system as claimed in claim 17, wherein said presentational information includes at least one of instructions for rendering components of said presented application and said second information, default parameters and data values exhibited within said components, and application-specific business logic for processing input to said presented application.

19. The system as claimed in claim 17, wherein said interactive link includes a graphical representation displayed on said client computer and a file containing information representing the operating environment of said requesting client computer and a network address of said second server computer.

20. The system as claimed in claim 19, wherein said graphical representation includes a symbol for indicating that said graphical representation is of an interactive link and at least one of an icon and a label representing a commercially recognizable brand name of at least one of said presented applications and said second information.

21. The system as claimed in claim 17, comprising:
a data repository for storing, at said second server computer, information representing a first operating state of said applications and said second information presented to a particular user at a client computer; and
means for retrieving and presenting said first operating state information from said data repository as said invoked application and said second information is re-presented to said particular user.

22. The system as claimed in claim 17, comprising means for transmitting and storing a copy of said interactive link to a next client computer such that said next client computer is operable for selectively invoking said applications and said second information and for forming said communication connection between said next client computer and said second server computer.

23. The system as claimed in claim 22, comprising a data repository for storing information for tracking transmissions of said interactive links between said plurality of client computers.

24. The system as claimed in claim 17, wherein said network further includes an Internet connection and said client computers include a desktop-based repository for said inactive links to said presented applications and said second information and an Internet-based repository for said interactive links, and wherein said interactive links are selectively stored in one of said desktop-based repository and said Internet-based repository.

25. The system as claimed in claim 17, wherein said network further includes an Internet connection and said client computers include a desktop-based repository for said inactive links to said presented applications and said second information and an Internet-based repository for said interactive links, and wherein said interactive links are selectively stored in both of said desktop-based repository and said Internet-based repository.

26. A computer processing system, comprising:
- a plurality of client computers;
- a plurality of server computers;
- a network operatively coupling said plurality of client computers to said plurality of server computers; and
- computer program code for presenting over said network, in response to a selection of an interactive link, applications and first information stored in a first of said plurality of server computers, said computer program code comprising:
  - a plurality of computer program code segments embedded with informational content stored at a second of said plurality of server computers and delivered to a requesting one of said plurality of client computers;
  - an operating system program code segment, one executable at each of said plurality of client computers; and
  - a plurality of presentation client computer program code segments, one executable at each of said plurality of client computers, for retrieving presentational information and presenting at each of said client computers, in cooperation with said operating system computer program code segment, said applications and said first information based on said presentational information.

* * * * *

US006687745C1

(12) INTER PARTES REEXAMINATION CERTIFICATE (0236th)

United States Patent
Franco et al.

(10) Number: US 6,687,745 C1
(45) Certificate Issued: Mar. 1, 2011

(54) SYSTEM AND METHOD FOR DELIVERING A GRAPHICAL USER INTERFACE OF REMOTE APPLICATIONS OVER A THIN BANDWIDTH CONNECTION

(75) Inventors: Louis M. Franco, Hoboken, NJ (US); Frank Leon Rose, Brooklyn, NY (US); Philip S. J. Brittan, Brooklyn, NY (US); Mark Cunningham, Brooklyn, NY (US); Alex Bulkin, Brooklyn, NY (US); Mat Baskin, Bronx, NY (US); Greg Blonder, Summit, NJ (US)

(73) Assignee: Droplets, Inc., Dallas, TX (US)

Reexamination Request:
No. 95/000,295, Aug. 3, 2007

Reexamination Certificate for:
Patent No.: 6,687,745
Issued: Feb. 3, 2004
Appl. No.: 09/599,382
Filed: Jun. 22, 2000

Related U.S. Application Data

(60) Provisional application No. 60/153,917, filed on Sep. 14, 1999.

(51) Int. Cl.
*G06F 15/16* (2006.01)

(52) U.S. Cl. ...................................................... 709/219
(58) Field of Classification Search .................. None
See application file for complete search history.

(56) References Cited

U.S. PATENT DOCUMENTS

| 5,204,947 A | 4/1993 | Bernstein et al. |
| 5,276,607 A | 1/1994 | Harris |
| 5,717,939 A | 2/1998 | Bricklin |
| 5,742,835 A | 4/1998 | Kaethler |
| 5,767,847 A | 6/1998 | Mori |
| 5,768,158 A | 6/1998 | Adler |
| 5,768,510 A | 6/1998 | Gish |
| 5,796,952 A | 8/1998 | Davis et al. |
| 5,802,530 A | 9/1998 | van Hoff |
| 5,838,906 A | 11/1998 | Doyle et al. |

(Continued)

FOREIGN PATENT DOCUMENTS

| KR | 199964264 | 7/1997 |
| WO | 0120848 | 7/2007 |

OTHER PUBLICATIONS

Marimba Screen Shots Page, Jan. 11, 1992. 2 pages.*
Lemay, Official Guide to Castanet, Sams.net, 1997, 195 pages.

(Continued)

*Primary Examiner*—My-Trang Nu Ton

(57) ABSTRACT

A method and system are disclosed for delivering interactive links for presenting applications and second information at a client computer from remote sources in a network-configured computer processing system. In one embodiment, the method includes retrieving over a first communication connection, in response to a request of a client computer, informational content having computer program code embedded therein, and executing the embedded computer program code for establishing a second communication connection to an application server. The method further includes retrieving over the second communication connection first information including presentational information for presenting the application and the second information. The method also includes presenting the application and the second information based upon the presentational information, and storing on the client computer an interactive link for selectively re-establishing the second communication connection to the application server for retrieving the first information and presenting the application and the second information on an as-needed basis. Preferably, the storing of the interactive link includes downloading a graphical representation of the interactive link and storing a file containing information representing an operating environment of the client computer and a network address of the application server.

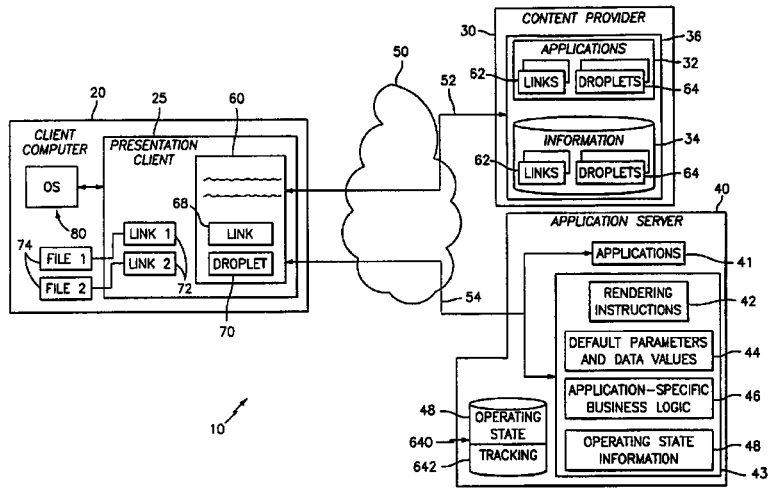

U.S. PATENT DOCUMENTS

| | | | |
|---|---|---|---|
| 5,838,910 | A | 11/1998 | Domenikos et al. |
| 5,848,246 | A | 12/1998 | Gish |
| 5,877,765 | A | 3/1999 | Dickman et al. |
| 5,877,767 | A | 3/1999 | Yohanan |
| 5,889,942 | A | 3/1999 | Orenshteyn |
| 5,905,248 | A | 5/1999 | Russell et al. |
| 5,919,247 | A | 7/1999 | Van Hoff et al. |
| 5,933,599 | A | 8/1999 | Nolan |
| 5,950,008 | A | 9/1999 | van Hoff |
| 5,966,705 | A | 10/1999 | Koneru |
| 5,970,506 | A | 10/1999 | Kiyan |
| 5,987,245 | A | 11/1999 | Gish |
| 5,999,972 | A | 12/1999 | Gish |
| 6,009,410 | A | 12/1999 | LeMole et al. |
| 6,011,918 | A | 1/2000 | Cohen et al. |
| 6,026,437 | A | 2/2000 | Muschett |
| 6,029,141 | A | 2/2000 | Bezos |
| 6,038,590 | A | 3/2000 | Gish |
| 6,043,815 | A | 3/2000 | Simonoff et al. |
| 6,052,711 | A | 4/2000 | Gish |
| 6,064,382 | A | 5/2000 | Diedrich et al. |
| 6,076,166 | A | 6/2000 | Moshfeghi |
| 6,078,321 | A | 6/2000 | Simonoff et al. |
| 6,078,322 | A | 6/2000 | Simonoff et al. |
| 6,088,515 | A | 7/2000 | Muir et al. |
| 6,091,412 | A | 7/2000 | Simonoff et al. |
| 6,105,063 | A | 8/2000 | Hayes |
| 6,115,040 | A | 9/2000 | Bladow |
| 6,226,654 | B1 | 5/2001 | van Hoff |
| 6,233,620 | B1 | 5/2001 | Gish |
| 6,240,442 | B1 | 5/2001 | Domenikos et al. |
| 6,253,282 | B1 | 6/2001 | Gish |
| 6,266,709 | B1 | 7/2001 | Gish |
| 6,272,555 | B1 | 8/2001 | Gish |
| 6,272,556 | B1 | 8/2001 | Gish |
| 6,304,893 | B1 | 10/2001 | Gish |
| 6,317,761 | B1 | 11/2001 | Landsman et al. |
| 6,324,578 | B1 | 11/2001 | Cox |
| 6,351,746 | B1 | 2/2002 | Gebauer |
| 6,357,038 | B1 | 3/2002 | Scouten |
| 6,362,836 | B1 | 3/2002 | Shaw et al. |
| 6,362,840 | B1 | 3/2002 | Burg et al. |
| 6,370,552 | B1 | 4/2002 | Bloomfield |
| 6,370,570 | B1 | 4/2002 | Muir et al. |
| 6,393,569 | B1 | 5/2002 | Orenshteyn |
| 6,424,991 | B1 | 7/2002 | Gish |
| 6,434,598 | B1 | 8/2002 | Gish |
| 6,460,123 | B1 | 10/2002 | Blumenau |
| 6,463,343 | B1 | 10/2002 | Emens et al. |
| 6,470,378 | B1 | 10/2002 | Tracton et al. |
| 6,535,912 | B1 | 3/2003 | Anupam et al. |
| 6,544,295 | B1 | 4/2003 | Bodnar |
| 6,546,554 | B1 | 4/2003 | Schmidt |
| 6,553,417 | B1 | 4/2003 | Gampper |
| 6,636,885 | B1 | 10/2003 | Martin |
| 6,654,814 | B1 | 11/2003 | Britton et al. |
| 6,687,745 | B1 | 2/2004 | Franco |
| 6,691,157 | B2 | 2/2004 | Muir |
| 6,697,861 | B2 | 2/2004 | Barnier et al. |
| 6,782,431 | B1 | 8/2004 | Mukherjee et al. |
| 6,799,195 | B1 | 9/2004 | Thibault et al. |
| 7,206,085 | B1 | 4/2007 | Eguchi |
| 7,243,352 | B2 | 7/2007 | Mandava et al. |
| 7,321,917 | B2 | 1/2008 | Durham |
| 7,340,716 | B1 | 3/2008 | Chansler |
| 2001/0044819 | A1 | 11/2001 | Gong |
| 2002/0095478 | A1 | 7/2002 | Muir et al. |
| 2003/0018885 | A1 | 1/2003 | Landsman et al. |
| 2003/0154261 | A1 | 8/2003 | Doyle et al. |
| 2005/0010647 | A1 | 1/2005 | Durham |

OTHER PUBLICATIONS pcAnywhere User's Guide v9.2, Symantec, 1999.
URL: http://web.archive.org/web/20001110010400/java.sun.com/features/2000, Wang (2000) Announcing Java web Start Technology, 5 pages.
Vanderheiden and Chisholm, Central Reference Document—Version 8 Unified Web Site Accessibility Guidelines, Jan. 20, 1998.
W3C Working Draft, Techniques for Web Content Accessibility Guidelines, Mar. 24, 1999.
W3C Recommendation, Web Content Accessibility Guidelines 1.0, May 5, 1999.
W3C Note, Composite Capability/Preference Profiles (CC/PP): A User Side Framework for Content Negotiation, Jul. 27, 1999.
W3C Note, Composite Capability/Preference Profiles (CC/PP): A User Side Framework for Content Negotiation, Nov. 30, 1998.
W3C Note, Client–Specific Web Services by Using User Agent Attributes, Dec. 30, 1997.
Holtman and Mutz, RFC 2295, Transparent Content Negotiation in HTTP, Mar. 1998.
Fielding et al., RFC 2068, Hypertext Transfer Protocol—HTTP/1.1, Jan. 1997.
Fielding et al., RFC 2616, Hypertext Transfer Protocol—HTTP/1.1, Jun. 1999.
Seshan, Benefits of Transparent Content Negotiation in HTTP, Nov. 1998.
International Search Report dated Jan. 9, 2001.
HotJava Views, Sun Microsystems, 1997.
Supplemental European Search Report dated Sep. 14, 2006.
Java Network Launcher Protocol & API Specification, Version 1.0, JSR–56 (2000) Sun Microsystems, 75 pages.
URL: http://www.sun.com/smi/press/sunflash/2000–06/sunflash.20000606.3.xml, Sun Microsystems Delivers next Generation Client–Side Java Technology, 3 pages.
Knut Manske, et al. (1998) "Comic Actors Representing Software Agents", Telecooperation Department, University of Linz, Austria, IEEE proceedings 1998, pp. 213–222; and.
Richard S. Hall, et al. (1997) "An Architecture for Post–Development Configuration Management in a Wide–Area Network", Software Engineering Research Laboratory, Department of Computer Science, Proceeding of the 1997 Inter. Conference on Distributed Computing Systems, Baltimore Maryland, pp. 269–278.
The Castanet Tuner and how channels appear, 2 pages.
Ice–T User's Guide, Sun Microsystems, 1996, 50 pages.
The Castanet Solution, Marimba, <http://web.archive.org/web/19980111091209/www.marimba.com/datasheets/castanet–ds–2_0.html>, Jan. 11, 1998, 11 pages.
Marimba: Castanet, Marimba, <http://web.archive.org/web/19980111091337/www.marimba.com/datasheets/castanet–wp.html>, Jan. 11, 1998, 7 pages.
Marimba Screen Shots Page, Marimba, <http://web.archive.org/web/19980111091711/www.marimba.com/press/screenshots.html>, Jan. 11, 1998, 2 pages.
RFC 1945, Hypertext Transfer Protocol—HTTP/1.0, May 1996, 60 pages.

* cited by examiner

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-26 is confirmed.

New claims 27-104 are added and determined to be patentable.

27. *The method as claimed in claim 1, wherein the second information relating to the operating environment of the client computer further includes information regarding an operating system and hardware capabilities of the client computer.*

28. *The method as claimed in claim 1, wherein the computer program code embedded in the first information determines a plurality of user interface requirements from the operating environment of the client computer.*

29. *The method as claimed in claim 1, wherein the second information further includes information identifying the second host computer to connect with and the application on the second host computer to present on the client computer once the second communication connection is established.*

30. *The method as claimed in claim 1, wherein the second communication connection is a continuous open socket communication connection.*

31. *The method as claimed in claim 30, wherein a real-time push of update information is sent from the second host computer to the client computer.*

32. *The method as claimed in claim 1, wherein the second communication connection is a non-continuous communication connection.*

33. *The method as claimed in claim 32, wherein a real-time pull of update information is retrieved from the second host computer by the client computer.*

34. *The method as claimed in claim 1, further comprising: applying a skin to the presentation of the application in response to a user selection.*

35. *The method as claimed in claim 1, wherein the first information is a document that includes an interactive link.*

36. *The method as claimed in claim 1, further comprising: retrieving a plurality of first information each having computer program code embedded therein; and simultaneously executing the plurality of embedded computer program code to establish a plurality of communication connections to the second host computer.*

37. *The method as claimed in claim 1, further comprising: transmitting information between the client computer and the second host computer using a network communication protocol.*

38. *The method as claimed in claim 37, wherein the network communication protocol comprises a plurality of message formats to communicate properties and events pertaining to components of the application.*

39. *The method as claimed in claim 38, wherein the message formats comprise event notifications, update commands, window commands, browser commands, session commands and service directory.*

40. *The method as claimed in claim 38, wherein communication protocol and message formats transmit information defining a net change of information between a current application state and a next application state.*

41. *The method as claimed in claim 40, further comprising: refreshing a state of the application presented on the client computer using the net change information without retrieving an entire presentation information.*

42. *The method as claimed in claim 1, further comprising: storing information for tracking the presenting of the application.*

43. *The method as claimed in claim 42, wherein the information for tracking includes a global unique identifier assigned to the interactive link and information for identifying the client computer storing the interactive link.*

44. *The method as claimed in claim 1, further comprising: transmitting information to a plurality of client computers storing a particular first information and interactive link via an event channel.*

45. *The method as claimed in claim 3, wherein the file further contains the identification of the application presented on the client computer.*

46. *The method as claimed in claim 3, wherein the file further contains machine local addresses for both the second host computer and the client computer.*

47. *The method as claimed in claim 3, wherein the file further contains ports.*

48. *The method as claimed in claim 17, wherein the operating system program code further includes information regarding an operating system and hardware capabilities of the plurality of client computers.*

49. *The method as claimed in claim 17, wherein the computer program code embedded in the informational content determines a plurality of user interface requirements from the operating system program code of the plurality of client computers.*

50. *The method as claimed in claim 17, wherein the operating system program code further includes information identifying the second server computer to connect with and the invoked applications on the second server computer to present on the plurality of client computers once the communication connection is established.*

51. *The method as claimed in claim 17, wherein the communication connection is a continuous open socket communication connection.*

52. *The method as claimed in claim 51, wherein a real-time push of update information is sent from the second server computer to the plurality of client computers.*

53. *The method as claimed in claim 17, wherein the communication connection is a non-continuous communication connection.*

54. *The method as claimed in claim 53, wherein a real-time pull of update information is retrieved from the second server computer by the plurality of client computers.*

55. *The method as claimed in claim 17, further comprising: applying a skin to the presentation of the invoked application in response to a user selection.*

56. *The method as claimed in claim 17, wherein the informational content is a document including an interactive link.*

57. *The method as claimed in claim 17, further comprising: retrieving a plurality of informational content each having computer program code embedded therein; and*

58. The method as claimed in claim 17, further comprising:
transmitting information between the plurality of client computers and the second server computer using a network communication protocol.

59. The method as claimed in claim 58, wherein the network communication protocol comprises a plurality of message formats to communicate properties and events pertaining to components of the presented application.

60. The method as claimed in claim 59, wherein the message formats comprise event notifications, update commands, window commands, browser commands, session commands and service directory.

61. The method as claimed in claim 59, wherein communication protocol and message formats transmit information defining a net change of information between a current application state and a next application state.

62. The method as claimed in claim 61, further comprising:
refreshing a state of the application presented on the plurality of client computers using the net change information without retrieving an entire presentation information.

63. The method as claimed in claim 17, further comprising:
storing information for tracking the presenting of the application.

64. The method as claimed in claim 63, wherein the information for tracking includes a global unique identifier assigned to the interactive link and information for identifying the plurality of client computers storing the interactive link.

65. The method as claimed in claim 17, further comprising:
transmitting information to the plurality of client computers storing a particular informational content and interactive link via an event channel.

66. The method as claimed in claim 19, wherein the file further contains the identification of the invoked applications on the plurality of client computers.

67. The method as claimed in claim 19, wherein the file further contains machine local addresses for both the second server computer and the plurality of client computers.

68. The method as claimed in claim 19, wherein the file further contains ports.

69. The computer processing system as claimed in claim 26, wherein the presentational information includes at least one of instructions for rendering components of the presented application, default parameters and data values exhibited within the components, and application-specific business logic for processing input to the presented application.

70. The computer processing system as claimed in claim 26, comprising computer program code for:
downloading to the client computer a graphical representation of the interactive link; associating, at the client computer, the graphical representation with a file containing information representing the operating environment of the client computer and a network address of the second host computer; and
displaying the grapical representation on the client computer.

71. The computer processing system as claimed in claim 26, comprising computer program code for transmitting a copy of the interactive link to a next client computer such that the next client computer is operable for selectively establishing a communication connection to the second host computer for retrieving the third information and presenting, at the next client computer, the application and the fourth information.

72. The computer processing system as claimed in claim 71, comprising computer program code for storing information for tracking transmissions of interactive links between the plurality of client computers.

73. The computer processing system as claimed in claim 72, wherein the information for tracking comprises a global unique identifier that is assigned to the interactive link and information for identifying each client computer that has received the interactive link.

74. The computer processing system as claimed in claim 26, wherein the network configured computer processing system includes an Internet connection and the client computer includes a desktop-based repository for links to the present applications and the fourth information and an Internet-based repository for the links, and wherein the storing of the interactive link comprises selectively storing the interactive link in one of the desktop-based repository and the internet-based repository.

75. The computer processing system as claimed in claim 26, wherein the network configured computer processing system includes an Internet connection and the client computer includes a desktop-based repository for links to the presented applications and the fourth information and an Internet-based repository for the links, and wherein the storing of the interactive link comprises storing the interactive link in both of the desktop-based repository and the internet-based repository.

76. The computer processing system as claimed in claim 26, wherein the second information relating to the operating environment of the client computer further includes information regarding an operating system and hardware capabilities of the client computer.

77. The computer processing system as claimed in claim 26, wherein the computer program code embedded in the first information determines a plurality of user interface requirements from the operating environment of the client computer.

78. The computer processing system as claimed in claim 26, wherein the second information further includes information identifying the second host computer to connect with and the application on the second host computer to present on the client computer once the second communication connection is established.

79. The computer processing system as claimed in claim 26, wherein the second communication connection is a continuous open socket communication connection.

80. The computer processing system as claimed in claim 79, wherein a real-time push of update information is sent from the second host computer to the client computer.

81. The computer processing system as claimed in claim 26, wherein the second communication connection is a non-continuous communication connection.

82. The computer processing system as claimed in claim 81, wherein a real-time pull of update information is retrieved from the second host computer by the client computer.

83. The computer processing system as claimed in claim 26, further comprising computer program code for:
applying a skin to the presentation of the application in response to a user selection.

84. The computer processing system as claimed in claim 26, wherein the first information is a document that includes an interactive link.

85. The computer processing system as claimed in claim 26, further comprising computer program code for:
  retrieving a plurality of first information each having computer program code embedded therein; and
  simultaneously executing the plurality of embedded computer program code to establish a plurality of communication connections to the second host computer.

86. The computer processing system as claimed in claim 26, further comprising computer program code for:
  transmitting information between the client computer and the second host computer using a network communication protocol.

87. The computer processing system as claimed in claim 86, wherein the network communication protocol comprises a plurality of message formats to communicate properties and events pertaining to components of the application.

88. The computer processing system as claimed in claim 87, wherein the message formats comprise event notifications, update commands, window commands, browser commands, session commands and service directory.

89. The computer processing system as claimed in claim 87, wherein communication protocol and message formats transmit information defining a net change of information between a current application state and a next application state.

90. The computer processing system as claimed in claim 89, further comprising computer program code for:
  refreshing a state of the application presented on the client computer using the net change information without retrieving an entire presentation information.

91. The computer processing system as claimed in claim 26, further comprising computer program code for:
  storing information for tracking the presenting of the application.

92. The computer processing system as claimed in claim 91, wherein the information for tracking includes a global unique identifier assigned to the interactive link and information for identifying the client computer storing the interactive link.

93. The computer processing system as claimed in claim 26, further comprising computer program code for:
  transmitting information to a plurality of client computers storing a particular first information and interactive link via an event channel.

94. The computer processing system as claimed in claim 70, wherein the file further contains the identification of the application presented on the client computer.

95. The computer processing system as claimed in claim 70, wherein the file further contains machine local addresses for both the second host computer and the client computer.

96. The computer processing system as claimed in claim 70, wherein the file further contains ports.

97. The computer processing system as claimed in claim 70, comprising computer program code for allowing a user of the client computer to drag and drop the graphical representaion onto the client computer.

98. The computer processing system as claimed in claim 70, wherein the graphical representation includes information for identifying the presented application and the fourth information invoked by the interactive link and a symbol for indicating that the graphical representation is of an interactive link.

99. The computer processing system as claimed in claim 98, wherein the information for identifying is comprised of at least one of an icon and a label representing a commercially recognizable brand name of at least one of the presented application and the fourth information.

100. The computer processing system as claimed in claim 98, wherein the symbol is comprised of a teardrop-shaped symbol.

101. The computer processing system as claimed in claim 70, wherein the file further contains instructions for rendering components of the presented application, default parameters and data values exhibited within the components, and application-specific business logic for processing input to the presented application, and wherein the instructions override at least a portion of the third information retrieved from the second host computer.

102. The computer processing system as claimed in claim 70, comprising computer program code for:
  the user selecting the grahpical representation; and
  in response to the selection, accessing the contents of the file associated with the graphical representation and reestablishing the second communication connection to the second host computer for retrieving the third information and presenting the application and the fourth information associated to the interactive link.

103. The computer processing system as claimed in claim 102, comprising computer program code for:
  storing, at the second host computer, information representing a first operating state of the application and the fourth information presented to the user; and
  in response to the selection of the graphical representation, presenting the first operating state information as the application and the fourth information are again presented to the user.

104. The computer processing system as claimed in claim 103, wherein the first operating state information is presented to the user at any one of the plurality of client computers.

* * * * *